US010565357B2

(12) United States Patent
Pitel et al.

(10) Patent No.: US 10,565,357 B2
(45) Date of Patent: *Feb. 18, 2020

(54) METHOD FOR SECURELY TRANSMITTING A SECRET DATA TO A USER OF A TERMINAL

(71) Applicant: SKEYECODE, Paris (FR)

(72) Inventors: Guillaume Pitel, L'Hay les Roses (FR); Jean-Luc Leleu, Paris (FR)

(73) Assignee: SKEYECODE, Paris (FR)

(*) Notice: Subject to any disclaimer, the term of this patent is extended or adjusted under 35 U.S.C. 154(b) by 176 days.

This patent is subject to a terminal disclaimer.

(21) Appl. No.: 15/801,036

(22) Filed: Nov. 1, 2017

(65) Prior Publication Data

US 2018/0145827 A1    May 24, 2018

(30) Foreign Application Priority Data

Nov. 2, 2016 (EP) .................................... 16196945
Nov. 2, 2016 (EP) .................................... 16196947
(Continued)

(51) Int. Cl.
*G06F 21/32* (2013.01)
*G06F 21/36* (2013.01)
(Continued)

(52) U.S. Cl.
CPC .............. *G06F 21/14* (2013.01); *G06F 21/36* (2013.01); *G06K 9/00087* (2013.01);
(Continued)

(58) Field of Classification Search
CPC ............................... G06F 21/606; G06F 21/14
(Continued)

(56) References Cited

U.S. PATENT DOCUMENTS 8,209,743 B1   6/2012 Frank
9,483,653 B2   11/2016 Dai
(Continued)

FOREIGN PATENT DOCUMENTS

| EP | 2525561 A1 | 11/2012 |
|---|---|---|
| WO | 2006128876 A2 | 12/2006 |
| WO | 2014198228 A1 | 12/2014 |

OTHER PUBLICATIONS

European Search Report for International Application 16196945.6, dated May 16, 2017, 7 pages.
European Search Report for International Application 16196947.2, dated May 16, 2017, 5 pages.
European Search Report for International Application 16196950.6, dated May 16, 2017, 7 pages.
(Continued)

*Primary Examiner* — Lynn D Feild
*Assistant Examiner* — Dereena T Cattungal
(74) *Attorney, Agent, or Firm* — Brake Hughes Bellermann LLP

(57) ABSTRACT

This disclosure relates to a method for securely transmitting secret information to a user, including receiving by the user terminal, from a secure processor, a software component protected against tampering and reverse-engineering and configured to generate sets of adjacent pixels having a probability lower than 100% to be in a visible or invisible state, executing the software component by the user terminal, at a frame display refresh rate, to generate the pixel sets at the display refresh rate, inserting the pixel sets generated by each execution of the software component into one respective image frame, and activating display of the image frames at the frame display refresh rate, the image frames including information which is machine unintelligible as being formed of the pixel sets, the information becoming intelligible to a user at the display refresh rate based on a human visual system.

22 Claims, 7 Drawing Sheets

(30) Foreign Application Priority Data

| Nov. 2, 2016 | (EP) | 16196950 |
| Nov. 2, 2016 | (EP) | 16196957 |
| May 24, 2017 | (EP) | 17172856 |

(51) Int. Cl.

| *G06F 21/14* | (2013.01) |
| *G06K 9/00* | (2006.01) |
| *H04L 9/32* | (2006.01) |
| *H04L 29/06* | (2006.01) |
| *G06Q 20/40* | (2012.01) |
| *H04L 9/08* | (2006.01) |
| *H04W 12/06* | (2009.01) |

(52) U.S. Cl.
CPC ........ *G06K 9/00288* (2013.01); *H04L 9/3271* (2013.01); *H04L 63/0428* (2013.01); *H04L 63/0853* (2013.01); *H04L 63/0861* (2013.01); *H04L 63/0884* (2013.01); *G06F 21/32* (2013.01); *G06F 2221/2103* (2013.01); *G06Q 20/40145* (2013.01); *H04L 9/085* (2013.01); *H04L 63/083* (2013.01); *H04L 63/0876* (2013.01); *H04L 2209/12* (2013.01); *H04L 2209/56* (2013.01); *H04W 12/06* (2013.01)

(58) Field of Classification Search
USPC ........................................................ 380/255
See application file for complete search history.

(56) References Cited

U.S. PATENT DOCUMENTS

| 2008/0205644 | A1* | 8/2008 | Lee ................. | H04N 7/1675 380/210 |
| 2009/0041380 | A1* | 2/2009 | Watanabe ............. | G06F 21/84 382/276 |
| 2009/0187757 | A1* | 7/2009 | Kerschbaum .......... | G06Q 10/10 713/153 |
| 2013/0301830 | A1* | 11/2013 | Bar-El ................ | H04L 9/08 380/210 |
| 2014/0250538 | A1* | 9/2014 | Rapaport ............ | G06F 21/31 726/28 |
| 2014/0281946 | A1* | 9/2014 | Avni ................. | G06T 1/0021 715/268 |
| 2015/0310655 | A1 | 10/2015 | Hill et al. | |
| 2015/0371613 | A1* | 12/2015 | Patel ................ | G06F 21/10 345/549 |
| 2016/0085974 | A1 | 3/2016 | Leleu | |

OTHER PUBLICATIONS

European Search Report for International Application 16196953.0, dated May 16, 2017, 8 pages.
European Search Report for International Application 16196957.1, dated May 16, 2017, 5 pages.
Jarvinen, Kimmo, et al., "Garbled Circuits for Leakage-Resilience: Hardware Implementation and Evaluation of One-Time Programs", Dep. of Information and Comp. Science, Alto University, Finland, 17 pages.

\* cited by examiner

METHOD FOR SECURELY TRANSMITTING A SECRET DATA TO A USER OF A TERMINAL

CROSS REFERENCE TO RELATED APPLICATIONS

This application claims priority to European Application Nos. EP16196947.2, EP16196945.6, EP 16196950.6, EP 16196957.1, filed Nov. 2, 2016, and EP Application No. EP17172856.1, filed May 24, 2017, the disclosures of which are incorporated herein by reference in their entireties.

TECHNICAL FIELD

This disclosure relates to methods and devices for securely authenticating a user from a non-secure terminal, and in particular, for executing a secure transaction involving a non-secure terminal and a remote server, based on a user authentication.

BACKGROUND

In general, mobile terminals, such as, for example, smartphones, personal computers, digital tablets, or the like, or any other connected device including devices belonging to the Internet of Things (IoT) may execute transactions, such as e-commerce transaction or fund transfer. These transactions, however, raise security problems, notably because "malicious software" or "malware" may be executed by a processor (e.g., CPU) of the terminal. The malware may be able to access all or a part of the memories accessible by the processor, and thus may be maliciously configured to spy on any transactions executed by the terminal and obtain any data manipulated during these transactions over a network.

To ensure the security of such transactions, one method is to entrust cryptographic computations to a dedicated secure element, such as a processor of, for example, a UICC ("Universal Integrated Circuit Card") card, and a SIM (subscriber identification module) card, in which cell phones are generally equipped. Further, in order to be able to execute one or more payment applications, the secure processor must be able to store as many secret cryptographic keys as there are payment applications. However, loading an application into the memory of the above-mentioned secure processor is a complex operation that needs to be highly secure. Specifically, it involves external parties such as Trusted Service Managers. For instance, since SIM cards are issued by cell phone operators, the latter may refuse to have such applications installed in the card. Furthermore, in the event of theft, or during maintenance of the telephone, the processor of the SIM card may be hacked by a hacker seeking to discover the secret keys stored in its memory.

In addition, accessing the secure functions installed in the processor of a SIM card generally entails inputting a secret code (PIN code) by means of a keypad or a touch-sensitive surface connected to the main processor of the terminal. In a typical configuration, the secret code input by the user necessarily passes through the main processor. Malware executed by the main processor can therefore access this secret code.

Further, to secure transactions performed using a terminal connected to a web site, one method may be to use a single-use secret code which is transmitted to the user each time a transaction needs to be validated. One solution is to transmit the single-use secret code to the user via a distinct communication channel, e.g., via a phone link or SMS (Short Message Service). The user may be required to input the received secret code on the terminal to validate the transaction. Another solution is to provide an additional hardware device to each of the users. This device may generate a single-use secret code after an authentication of the user by means of credentials, such as a password or biometric data. However, the above-mentioned solutions are burdensome for the users who do not always have nearby a phone or mobile or wireless network coverage (or the additional hardware device), when validating a transaction. Further, the solution requiring the additional hardware device is costly for organizations (e.g., banking). In addition, the solution using a secret code transmitted by SMS does not provide sufficient high security level since it has already been subjected to successful attacks.

SUMMARY

In a general aspect, a method for securely transmitting secret information to a user, including receiving by the user terminal, from a secure processor, a software component protected against tampering and reverse-engineering and configured to generate pixel sets of adjacent pixels, each pixel set having visible and invisible states and a probability lower than 100% to be in the visible or invisible state, executing the software component by the user terminal, at a rate corresponding to a frame display refresh rate, to generate the pixel sets at the display refresh rate, inserting the pixel sets generated by each execution of the software component into one respective image frame, and activating display of the image frames at the frame display refresh rate, the image frames including information which is machine unintelligible as being formed of the pixel sets, the information becoming intelligible to a user at the display refresh rate due to a human visual system.

In some implementations, the software component may be encoded as a garbled circuit including circuit inputs, circuit outputs, logic gates and wires, each logic gate having two inputs and one output, each wire having a first end connected to one of the circuit inputs or to one of the logic gate outputs and a second end connected to one of the logic gate inputs or to one of the circuit outputs, the garbled circuit being generated by selecting a valid data for each binary state of each of the wires, and by computing for one logic gate of the garbled circuit, truth table values as a function of each valid data of each input of the logic gate, each valid data of the output of the logic gate and a logic operation performed by the logic gate.

In some implementations, the software component may include one pixel set generation circuit for each pixel set to generate, each generation circuit including a first logic gate and a set of second logic gates, the first logic gate combining a first input data to a randomly selected second data, and providing an output data to a first input of each of the second logic gates, a second input of each of the second logic gates receiving a third input data, each of the outputs of the second logic gates providing a pixel value of the set of pixels.

In some implementations, one of the pixel set generation circuits may include several first logic gates, receiving first input data and randomly-selected second input data, and providing the output data to each of the second logic gates.

In some implementations, each pixel set may have a randomly selected position, and/or orientation and/or shape in the image frames.

In some implementations, each pixel set may form one segment, the segments formed by the pixels sets being arranged to form symbols, or numeric or alphanumeric characters, each of the segments being visible with a probability lower than 100% in the displayed image frames.

In some implementations, the software component may be configured to provide the output data in one of the two binary states with a probability between 12.5% and 87.5%. The method may further include adjusting the probability to provide the output data in one of the two binary states as a function of a user experience level.

In some implementations, the software component may be configured to generate encrypted image parts of an image frame including pixels having a probability lower than 100% to be in one of the two alternative binary states. The method may further include decrypting, by the user terminal, each generated encrypted image parts, using a decryption mask which is transmitted to the user terminal, by combining each pixel of each encrypted part with a respective pixel of the decryption mask, inserting, by the user terminal, the decrypted image parts into an image frame background to generate the image frames at the display refresh rate, and activating display of the generated image frames, by the user terminal, the displayed image frames including information machine unintelligible information as being formed of pixels having a probability lower than 100% to be visible in the displayed image frames, the information becoming intelligible to a user at the display refresh rate based on the human visual system.

In another general aspect, a method for securely transmitting a secret data from a user to a secure processor, including securely displaying secret challenge to a user by means of a user terminal, acquiring data input by the user in relation with the displayed secret challenge, and transmitting, by the user terminal, the data input by the user, to the secure processor, a secret data known by the user being determinable from the data input by the user and from the secret challenge.

In another general aspect, a user terminal may include a processor configured to: receive from a secure processor, a software component protected against tampering and reverse-engineering and configured to generate sets of pixels having a probability lower than 100% to be in a visible or invisible state, execute the software component, at a rate corresponding to a frame display refresh rate, to generate the pixel sets at the display refresh rate, insert the pixel sets generated by each execution of the software component into one respective image frame, and activate display of the image frames at the frame display refresh rate, the image frames including information which is machine unintelligible as being formed of the pixel sets, the information becoming intelligible to a user at the display refresh rate thanks to the persistence of the human visual system.

In some implementations, the terminal may be configured to execute the operations performed by a terminal in the previously defined methods.

In some implementations, the secure processor may be a secure element connected to a main processor of the terminal.

In some implementations, the secure processor may belong to a remote server linked to the terminal through a data transmission network.

In another general aspect, a secure element may be configured to execute the operations performed by a secure processor. The secure element may be connected to a main processor of a terminal.

In still another general aspect, a server may be configured to execute the operations performed by a secure processor. The server may be linked to the user terminal through a data transmission network.

In still another general aspect, a computer program product may be loadable into a computer memory and including code portions which, when carried out by a computer, configure the computer to carry out the operations performed by the previously defined user terminal.

BRIEF DESCRIPTION OF THE DRAWINGS

Examples of the method and/or device may be better understood with reference to the following drawings and description. Non-limiting and non-exhaustive descriptions are described with the following drawings.

DETAILED DESCRIPTION

In the figures, like referenced signs may refer to like parts throughout the different figures unless otherwise specified.

In the following, the term "secure" may be employed according to its plain meaning to those of ordinary skill in the art and may encompass, in different embodiments, security arising from techniques such as encryption, or other types of software or hardware control used to isolate information from the public or to protect it against unauthorized access or operation. The expressions "secure communication" and "secure communication link" may refer to communications that are encrypted using public/private key pairs, or symmetrical key encryption with keys shared between communicating points. "Secured communications" can also involve virtual private networks, and other methods and techniques used to establish authenticated and encrypted communications between the communicating points.

In view of the drawbacks and considerations noted above, it may be desirable to propose methods and devices for authenticating a user of a non-secure user terminal. It may also be desirable to protect secret data input by users and transaction data transiting through such a non-secure terminal. Further, it may be desirable to make the proposed method compatible with all existing terminals, even with terminals of low computation power.

For instance, such methods to protect transaction data transmitting through a non-secure terminal may include using a graphic processor of the terminal as a secure element to perform transactions. This method may include establishing a secure communication link between the graphic processor of the terminal and an authentication server, and displaying a virtual keypad with keys arranged in random order. The image of the keypad is displayed using visual cryptography, by successively displaying complementary frames in which the labels of the keys are not intelligible. The complementary frames may be combined into an intelligible image by the visual system of the user due to a retinal remanence thereof. In this way, even if a malicious program running on the main processor of the terminal is able to access the positions of the keys touched by the user during input of a secret code, it cannot, by taking a succession of screenshots, determine which labels correspond to the touched keys. However, this method requires important calculation resources that are not available in all portable devices (e.g., existing smartphones on the market).

Figure 1:
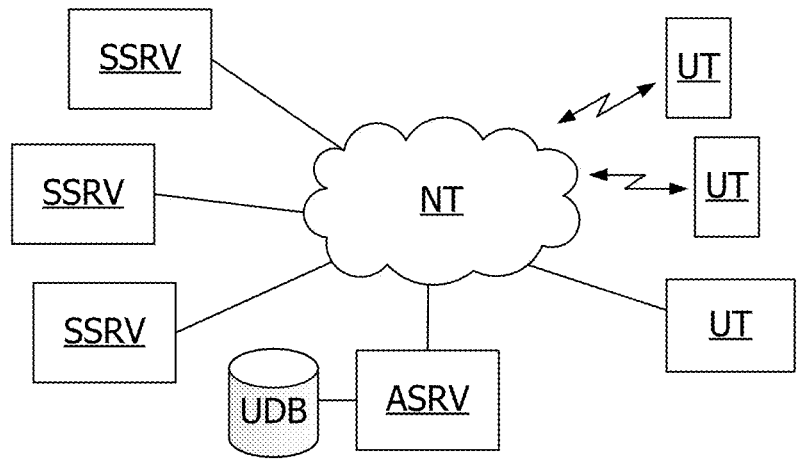
FIG. 1 is a block diagram of user terminals performing transactions with remote servers according to example embodiments.

FIG. 1 illustrates user terminals UT that can perform transactions with remote service provider servers or application servers SSRV through communication networks NT. In the following, the term "user terminal" shall be synonymous and refer to any device that can communicate with one or more remote servers such as application servers and service provider servers. Thus, a user terminal can be for instance a mobile phone, a smartphone, a personal computer a digital tablet or any equipment including communication and display capabilities. Two functionalities may also be provided by two or several devices, provided that those devices are securely associated and/or linked. The communications networks may include IP (Internet Protocol) networks, such as Internet, mobile or cellular networks, wireless networks, and any kind of network that can be used to establish a communication link between a user terminal and a remote server.

In some implementations, an authentication server ASRV may be configured to implement a method for authenticating a user during transactions involving an application or service provider server SSRV and a user terminal UT, based on a two-factor authentication scheme.

Figure 2:
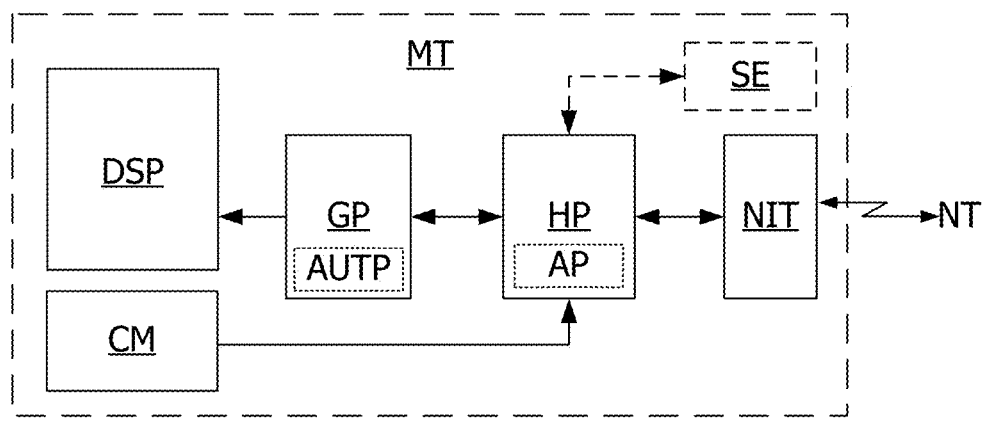
FIG. 2 is a block diagram of a user terminal.

FIG. 2 illustrates a conventional terminal UT, including communication circuits NIT for communicating with a remote server such as the server ASRV, through a transmission network such as the network NT. The terminal UT can be a cellular phone, a smartphone or a PDA (Personal Digital Assistant) or any other device such as a digital tablet or a personal computer including communication circuits to be connected to a network such as Internet network. The user terminal UT may further include a main processor HP (also called "Central Processing Unit"—CPU) connected to the communication circuits NIT, a display screen DSP, a graphic processor GP connected to the processor HP and controlling the display screen DSP, and a control device CM connected to the processor HP. The control device CM can include a keyboard or keypad, or a touch-sensitive surface. In some implementations, the control device CM can be transparent and disposed on the display screen DSP. The control device CM can further include a pointing device such as a mouse, a pencil, a pen, or the like.

The terminal UT can further include a secure element SE, for example, such as a secure processor that can be stand-alone or embedded into a smartcard UICC. The secure processor SE can be, for example, a SIM ("Subscriber Identity Module") card or a USIM ("Universal Subscriber Identity Module"), providing an access to a cellular network. In some implementations, the secure processor SE can include an NFC ("Near Field Communication") circuit to communicate with a contactless reader. In some implementations, the NFC circuit can be embedded into a SIM card (SIM-NFC) or UICC, or in a SoC ("System on Chip") circuit, or in an external memory card, for example an "SD card". The circuits NIT can include a mobile telecommunication circuit giving access to a mobile cellular network and/or to the Internet network, through the cellular network, and/or a wireless communication circuit (Wi-Fi, Bluetooth™, or any other radio frequency or wireless communication methodology), and/or any other wired or wireless connection circuit that can be linked to a data transmission network such as the Internet.

Figure 3:
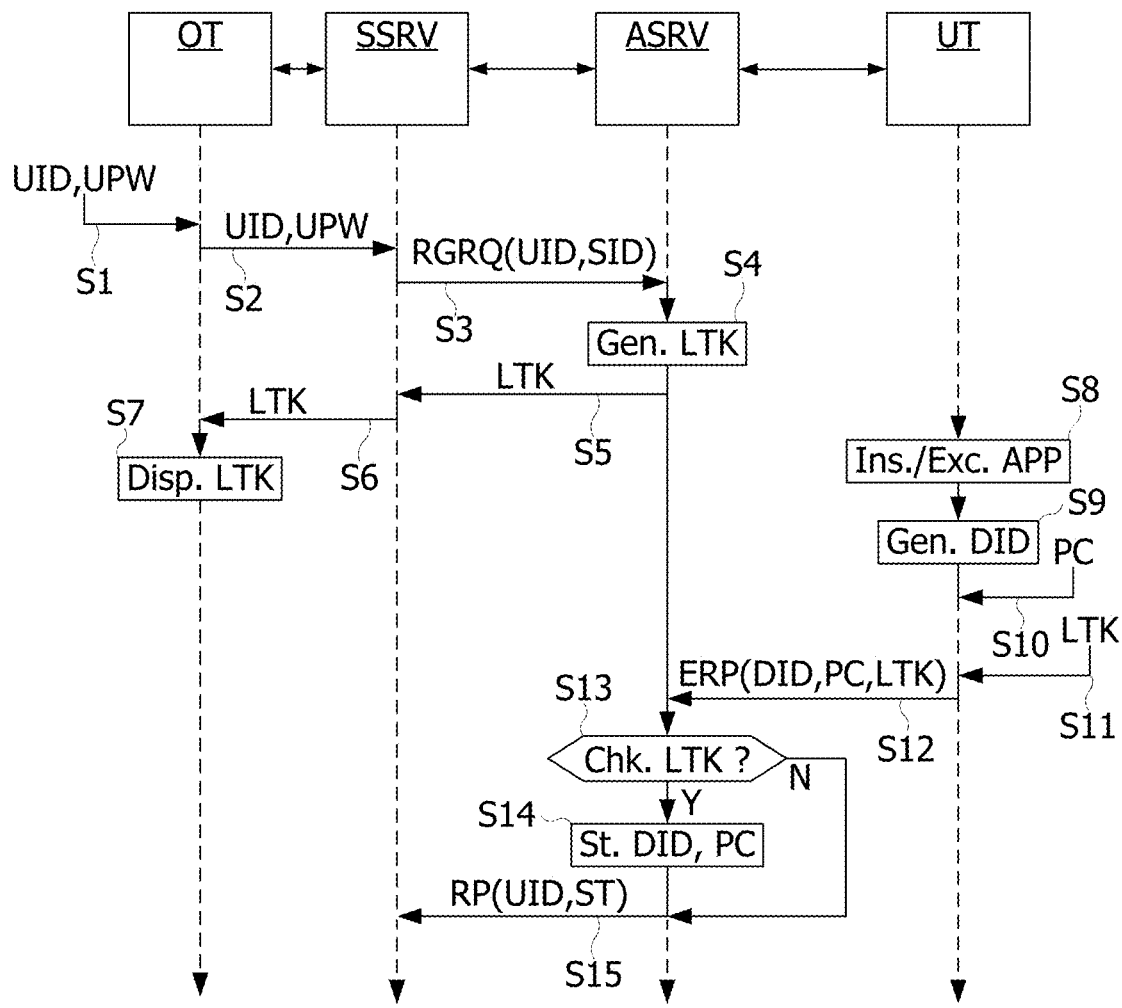
FIG. 3 is a sequential diagram of initialization steps performed by a user terminal, an authentication server and an application server, according to example embodiments.

FIG. 3 illustrates registration steps S1 to S14 for registering a user terminal UT to be used for authenticating a user to validate a transaction, in accordance with example embodiments. In some implementations, steps S1 to S7 can be executed once. In step S1, the user connects a user terminal OT to the server SSRV of the service provider, e.g. to a web site of the service provider, and may provide credentials, such as a user identifier UID and a corresponding password UPW to the server SSRV. In step S2, the user credentials UID, UPW may be transmitted by the terminal OT to the server SSRV. In step S3, the server SSRV may check consistency of the received credential UID, UPW and if the received credentials correspond to a valid registered user, the server SSRV may send to the authentication server ASRV, a registration request RGRQ containing the user identifier UID and a service identifier SID related to the service provider server SSRV (step S4). The communication link between the servers SSRV and ASRV may be secured, such that a hacker cannot retrieve the transmitted data. The following steps performed by the server ASRV may be executed by a secure processor of the server ASRV or within a secure domain thereof. Besides, the links between the terminals OT and the server SSRV and between the terminal UT and the server ASRV may not be required to be secure links.

In steps S4 and S5, the authentication server ASRV may generate a single-use link token LTK (dedicated to registration of the user identified in step S2) and may transmit the link token LTK to the server SSRV in response to the registration request RGRQ. The link token LTK may establish a link between the received user identifier UID and the service identifier SID. The link token LTK may have a time-limited validity that may be fixed to a value between several minutes out several hours. In step S6, the server SSRV may receive the link token LTK and may transmit the link token LTK to the terminal OT. In step S7, the terminal OT may display the link token LTK.

Steps S8 to S13 may be successively performed. In step S8, the user may download and/or may install and/or may launch an application APP dedicated to or involving user authentication in a user terminal UT to be used for authentication and involving the authentication server ASRV. The terminal UT may be the terminal OT or another terminal (e.g., a mobile phone, a smartphone, a smartwatch, a personal computer, a payment terminal and a digital tablet, or any equipment having communication and man-machine interface capabilities). Steps S9 to S13 may be performed at a first execution of the application APP. In step S9, the application APP may generate a unique device identifier DID of the terminal UT. Then, the user may be invited to choose a password PC and to input the link token LTK received and displayed in steps S6, S7. In steps S10 and S11, the user may input a password PC and the link token LTK. The link token LTK may be displayed in the form of an optical code, such as, for example, a QR code, and captured on the display screen of the terminal OT by the application APP using the camera of the terminal UT. In step S12, the application APP may transmit a registration message ERP to the authentication server ASRV. The registration message may contain the device identifier DID, the password PC, and/or the link token LTK. In step S13, the server ASRV may check the validity of the received link token LTK. A link token may be considered invalid, when its validity period has elapsed, when it has been already used once, and/or a predetermined number of times to identify a device. If the link token is valid, the server ASRV may store the device identifier DID and the password PC in a user database UDB in step S14. In step S15, the server ASRV may transmit a message RP in response to the request RGRQ to the service provider server SSRV. The message RP may contain the user identifier UID and a status of the registration depending on the validity check of the link token performed in step S13.

If the check performed in step S13 succeeds, the user terminal UT may be regularly registered by the server ASRV and thus can be used as a second authentication factor associated with the user, while the authentication of the user by the service provider server SSRV may be considered as a first authentication of the user.

Figure 4:
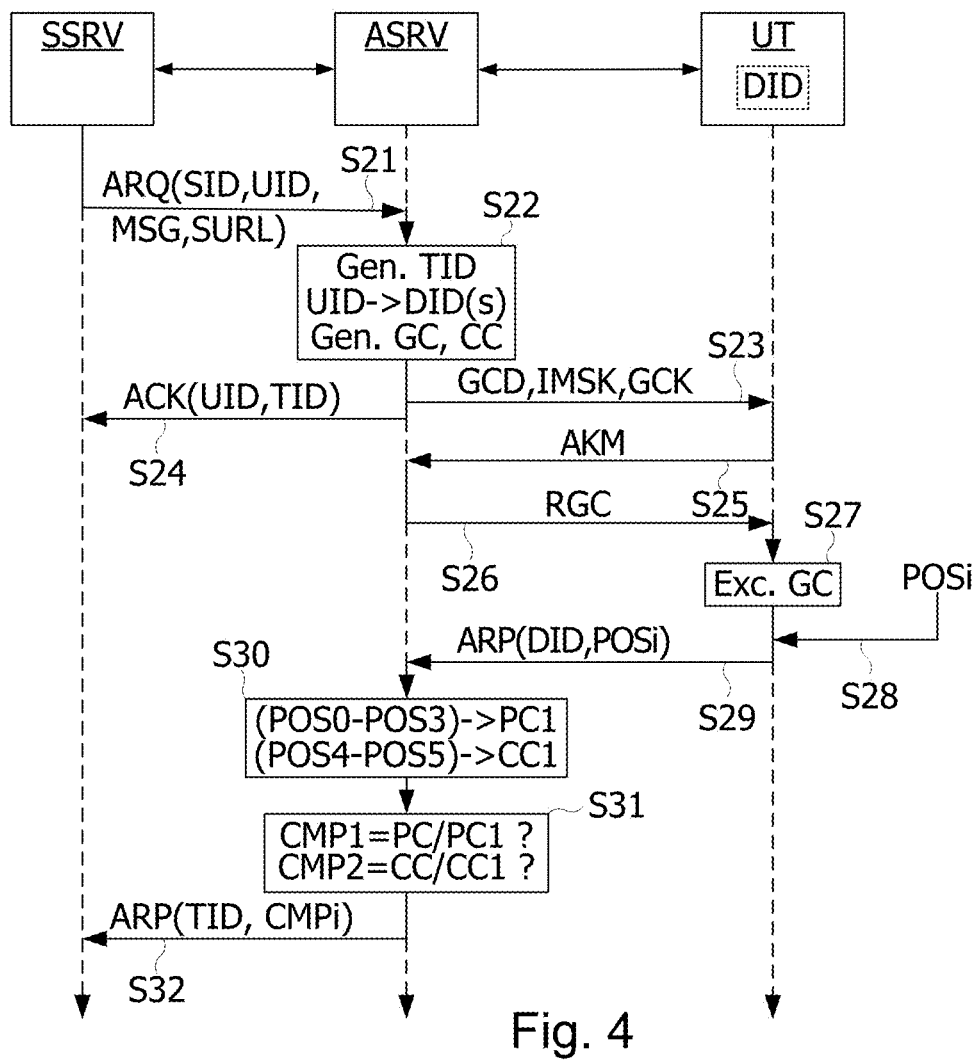
FIG. 4 is a sequential diagram showing authentication steps, according to example embodiments.

FIG. 4 illustrates authentication steps S21 to S32, which may be successively performed to authenticate the user during a transaction conducted by the application APP or for executing an operation of this application, requiring the user to be authenticated. During the authentication process, the user terminal UT may have been previously registered by the authentication server ASRV, for example by executing steps S1 to S15 of FIG. 3, which can be done in a separate preliminary process. In step S21, the service provider server SSRV may transmit an authentication request ARQ to the authentication server ASRV. The authentication request ARQ may contain an identifier SID of the service, and/or an identifier UID of the user involved in the transaction. In some implementations, the authentication request ARQ may optionally contain a message MSG to be displayed to the user and may present information related to the transaction to be validated by the user (e.g. an amount to be paid). The authentication request ARQ may also contain an address SURL where a result of the authentication can be transmitted by the authentication server ASRV.

In step S22, the authentication server ASRV may receive the request ARQ, and may generate a unique transaction identifier TID. The authentication server ASRV may further search the database UDB for device identifiers DID corresponding to the user identifier UID, and may generate a transaction validation code CC. For example, single-use, and distinct dedicated software component GC for each of the user terminals UT corresponding to the devices identifiers DID found in the database UDB. Since the software component GC is designed to display the validation code CC, the software component GC may be specific to this code. In step S23, the server ASRV may send to the terminal UT structure and content data GCD defining the software component GC and including input data of the software component in an encrypted form, a final mask IMSK to be applied to image frame parts generated by the software component circuit, and a cryptographic data GCK to be used to execute the software component. In step S24, the server ASRV may send an acknowledge message ACK to the server SSRV. The acknowledge message ACK may contain the user identifier UID and the transaction identifier TID. In step S25, the application APP executed by the terminal UT may receive the data GCD, IMSK, GCK related to the software component GC and transmitted in step S23, and may send an acknowledge message AKM to the server ASRV. If the application APP is not currently running on the terminal UT, the reception of the data related to the software component may trigger the execution of the application APP. In step S26, the server ASRV may send to the terminal UT a request RGC to execute the software component GC. In step S27, the reception of the notification RGC may trigger the execution by the application APP of the software component GC which may display image frames showing, for example, a keypad having keys, the message MSG, and/or the single-use transaction validation code CC of two or more digits, for example.

In some implementations, the keys of the keypad may be arranged in a randomly selected layout in the displayed frames, and only parts of labels of the keys and of the validation code may be displayed in each frame, such that the key labels and the validation code are intelligible only to the human visual system due to the persistence of the latter, but not in screenshots of the display screen DSP. In some implementations, the validation code CC may be superimposed on the message MSG (or vice-versa), such that the message MSG cannot be changed without disturbing the validation display.

In step S28, the user of the terminal UT may input the password PC and the displayed validation code CC. In the example of a smartphone, the user may use the displayed keypad, and may touch corresponding positions POSi of the keys of the displayed keypad. In step S29, the application APP may transmit the sequence of positions POSi selected by the user with the device identifier DID to the server ASRV. In step S30, the server ASRV may determine the password PC1 and the code CC1 corresponding to the positions POSi typed by the user. Since the keypad used to input the positions POSi was displayed by the software component GC which was generated by the server ASRV, the server ASRV may recognize the displayed keypad layout, and thus, can determine the keys labels corresponding to the positions POSi, and consequently the values of the password and validation code typed by the user. In step S31, the server ASRV may check consistency between the entered password PC1 and validation code CC1 with the ones (PC, CC) stored in the database UDB in association with the device identifier DID. For security reasons, the database UDB may only store a hash value HPC instead of a clear value of the password PC entered in step S10. In some implementations, the comparison operation of the password PC may be performed by applying a hash function to the typed password PC1 and by comparing the result of the hash function with the hash value HPC of the password PC stored in the database UDB. In step S32, the server ASRV may transmit to the service provider server SSRV using the address SURL, an authentication response containing the user identifier UID and the result of the comparisons performed in step S31. In this way, the user corresponding to the identifier UID may be authenticated and the transaction TID may be validated only when the typed password PC1 and validation code CC1 match the password PC stored in the database UDB and the validation code CC corresponding to the software component GC sent by the server ASRV to the user terminal UT in step S23.

In some implementations, the input of the password PC in step S10 may be performed by executing twice the steps S27 to S30 using two different software components to get two passwords from the user. After each execution of steps S27 to S30, the validation code CC1 may be checked and the password PC1 entered by the user may be validated by the server ASRV only if the validation code CC1 entered by the user is the same as the validation code CC displayed by the user terminal UT executing one software component GC. After two successful executions of steps S27 to S30, each providing a validated password PC1, the validated passwords PC1 entered during the first and second execution of the steps S27 to S30 may be compared, and if they are identical, the password PC1 may be stored in the database UDB to assign it to the user terminal UT. In addition, steps S11 to S15 are executed only once the password PC1 entered by the user may be stored in the database UDB. In this way, only the positions POSi typed by the user are transmitted from the user terminal UT to the server ASRV. Therefore, a malware installed in the terminal UT or a man-in-the-middle attack between the server ASRV and the user terminal UT cannot discover the typed codes PC and CC without executing the software component. If this happens, the hacker performing the attack, must send a message ARP to the server ASRV (as in step S29). Thus the server ASRV may receive two messages ARP for a same transaction or from the same user terminal UT, (e.g., one from the authenticated user and one from the hacker). In this case, the server ARSV can decide to invalidate the transaction or raise a flag or perform any other specific action related to this event.

In some implementations, the message ARP may be transmitted by the user to the server ASRV (step S29) by another transmission channel.

Figure 5:
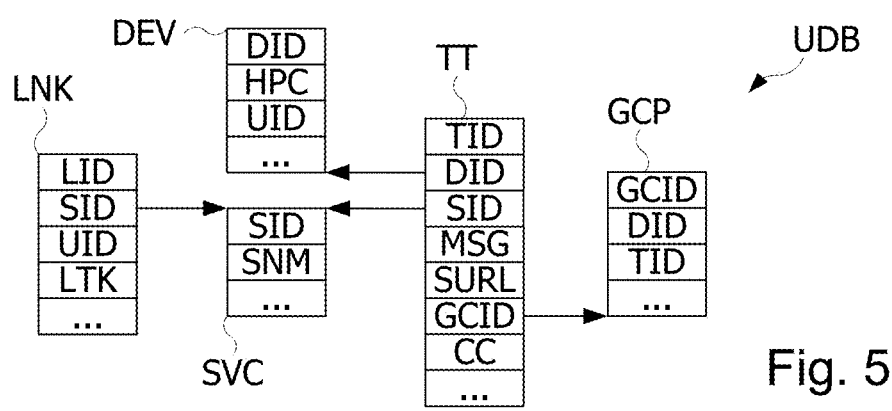
FIG. 5 is a block diagram of a database managed by the authentication server, according to example embodiments.

FIG. 5 illustrates different tables DEV, LNK, SVC, TT, GCP of the database UDB, according with example embodiments. The table DEV may contain one record for each registered user device or terminal UT. Each record may include a device identifier DID, the password PC entered by the user in step S10 or a hash value HPC thereof, and the corresponding user identifier UID. The table SVC may contain one record for each registered service provider. Each record of the table SVC may include a service identifier SID and a service name. The table LNK may contain one record for each link token generated in step S4. Each record may include a link identifier LID which may be generated with the link token LTK in step S4, the service identifier SID of the server SSRV requesting the link token in step S3, the user identifier UID of the user having triggered the link token request RGRQ in step S2, the link token value LTK, and a validity period of the link token. The table TT may contain one record for each current transaction. Each record may include a transaction identifier TID, a device identifier DID, a service identifier SID, the message MSG to be displayed by the application APP executed by the terminal having the identifier DID, the address SURL provided in step S21, an identifier GCID identifying the software component generated for the transaction TID, and a single-use transaction validation code CC. The table GCP may contain one record for each software component generated by the server ASRV. Each record may include an identifier GCID identifying the software component, a device identifier DID of the device UT for which the software component was generated in step S22, and the identifier TID of the transaction for which the software component was generated. Since the software components are dedicated to one transaction and consequently generated and executed for only one user authentication, the records corresponding to an already ended transaction can be deleted from the table GCP. In some implementations, the records may be kept for statistical purposes or to ensure the unicity of each transaction. In some implementations, each software component can be used for a predefined number of authentications or during a predefined period.

The operation of checking the received link token in step S13 can be performed by comparing the received link token LTK with the token stored in step S4 in the table LNK. The received link token can be retrieved in a record of the table LNK in relation with a user identifier UID having a device corresponding to the device identifier DID received by the server ASRV in step S12, and according to the table DEV. If not the case, the received link token may be considered as invalid and the user terminal UT may not be registered in the table DEV.

Figures 6A, 6B:
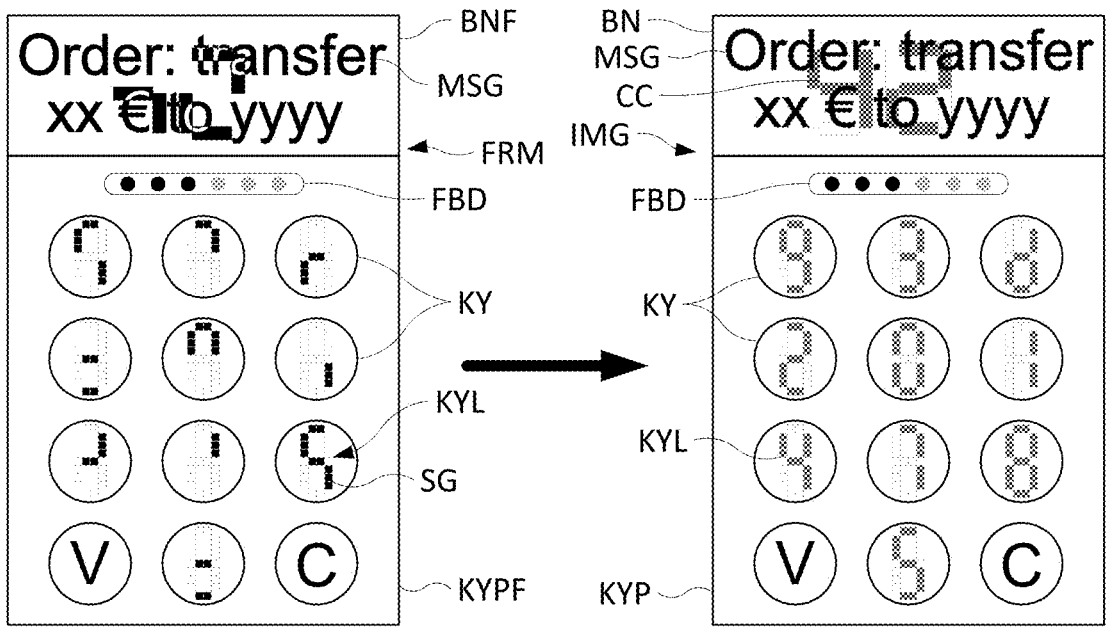
FIGS. 6A and 6B illustrate respectively an image frame displayed by the user terminal, and a corresponding resultant image which can be observed by a user of the user terminal, according to example embodiments.

FIG. 6A illustrates an example of an image frame FRM displayed by the user terminal UT when it executes the software component GC, according with example embodiments. The image frame FRM may include a banner frame BNF displaying the message MSG and the single-use code CC superimposed on the message MSG. The image frame FRM may further include a keypad image frame KYPF showing for example a twelve-key keypad. Each key of the keypad may be displayed with a label KYL indicating the function of the key to the user. In some implementations, the keypad may include an erase key "C" and a validation key "V", and ten keys corresponding to a digit, and having a layout specific to the software component GC which may generate the image frame FRM. In some implementations, the image frame FRM may further include a display zone FBD where a dot is displayed each time the user touches a new one of the keys KY. In the example of FIG. 6A, the display zone FBD may show that three keys were already typed by the user.

In the example of FIG. 6A, the keypad may include four lines of three keys. For example, the first line of the keypad may include (from left to right) the digits "9", "3" and "6", the second line may include the digits "2", "0" and "1", the third line may include the digits "4", "7", and "8" and the fourth line, the validation key "V", the digit "5" and the erase key "C". The label KYL of each digit key may be displayed by several segments SG (e.g. seven segments), visible or not, according to the key label KYL to be displayed. In some implementations, to prevent the keypad layout from being acquired using a screenshot function of the terminal UT, only a part of the visible segments in each key KY may be displayed in each image frame generated by the software component GC. To this purpose, each visible segment to be displayed may be present in an image frame FRM generated by the software component GC with a probability lower than approximately 100%, for example equal to approximately 50%. Due to its persistence property, a human visual system may combine the image frames successively displayed by the terminal UT. Thus, the displayed key labels KYL may become intelligible to the user, but cannot be captured using a screenshot function. FIG. 6B illustrates the displayed image IMG as it is perceptible by the human visual system when the image frames FRM generated by the software component GC are displayed at a sufficiently high frequency, for example, greater than 30 Hz. In some implementations, the frequency may be at 60 Hz, such that a new frame generated by the software component may be displayed every 16.6 ms. As shown in the example of FIG. 6B, the key labels KYL may appear in grey to a user when visible segments to be displayed of the key labels are inserted in the frames FRM with a probability lower than approximately 100%.

Figure 7:
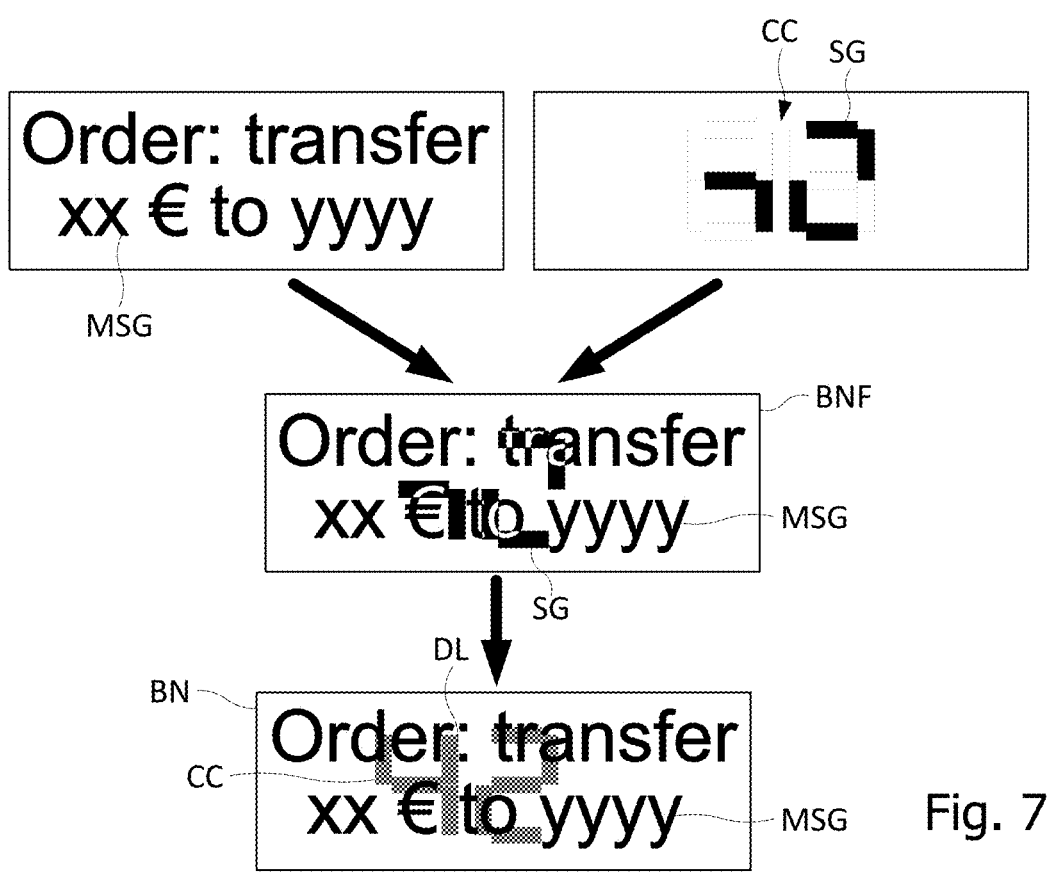
FIG. 7 illustrates two layers of a part of an image frame which are displayed superimposed by the user terminal, a corresponding part of a resultant image frame which is displayed by the user terminal, and a corresponding part of a resultant image which can be observed by a user of the user terminal, according to example embodiments.

FIG. 7 at the topmost diagram shows one example of two superimposed layers of the banner frame BNF produced by the software component GC and displayed by the terminal UT. The central part of FIG. 7 shows the banner frame as it is generated and displayed. The bottommost part of FIG. 7 shows the banner BN as it can be perceived by the user. The first layer of the banner frame BNF (at the top left of FIG. 7) may include the message MSG "Order: transfer xx € to yyyy" to be displayed. The second layer (at the top right of FIG. 7) may include a two-digit number corresponding to the validation code CC to be entered by the user in the terminal UT. Each digit of the validation code CC may be displayed using several segments SG (e.g., seven segments) which may be displayed or not as a function of the digit to be displayed. To prevent the validation code CC from being acquired using a screenshot function of the terminal UT, only a part of the visible segments SG may be displayed in each image frame FRM generated by the software component GC, such that each visible segment SG to be displayed is present in an image frame FRM generated by the software component GC with a probability lower than approximately 100%, for example equal to approximately 50%. The pixels of the first and second layers may be combined together by a XOR operation. Thus, in the generated banner frame BNF as shown in the central part of FIG. 7, the pixels belonging both to the message MSG and to a segment of the validation code CC, may be displayed in the background color, when the message and the segment are displayed in a color different from the background color.

The bottom part of FIG. 7 illustrates the displayed banner BN as it is perceptible by the human visual system, when the image frames FRM generated by the software component are displayed at a sufficiently high frequency, for example, greater than 30 Hz. In some implementations, the frequency may be at 60 Hz, such that a new frame FRM is displayed every 16.6 ms. The two digits labels DL of the validation code CC may appear in grey (in the example of FIG. 7) to the user, when visible segments to be displayed are inserted in the banner frames BNF with a probability lower than 100%.

In some implementations, visible and invisible segments of each digit KYL, DL to be displayed appear in the frames FRM with respective probabilities such that the displayed digits are intelligible for the human visual system, due to the persistence of the latter. For example, the generated software components GC may be configured to display the invisible segments with a probability of approximately 0 to 15%, and the visible segments with a probability of approximately 50 to 100%. The visible segments forming a key label KYL or a digit of the validation code CC can be displayed with respective probabilities between approximately 50 and 100%, and the invisible segments in a key label or a digit of the validation code CC can be displayed with respective probabilities between approximately 0 and 15%. The display probabilities of the segments forming the digits of the key labels and the validation code CC can be adjusted as a function of the frame display frequency, such that the labels of the displayed digits remain intelligible for the human visual system. Segments or pixels may be invisible or visible in the image frame FRM when they are displayed respectively with a background color of the image frame, or with a color different from the background color. The background color may be defined by the color of the pixels around the considered segment SG, and may vary as a function of the position of the segment within the image frame FRM.

In some implementations, the displayed keypad KYPF may not need to have a validation key "V". The validation of the typed codes may be performed when the user inputs the last digit of the password PC and validation code CC to be typed. For example, if the password PC comprises four digits and the validation code CC two digits, the execution of the software component GC can be ended when the user inputs six digits. The cancel key "C" can be managed either to delete the last typed digit or all the previously typed digits. The effects of the cancel key "C" may be shown to the user by erasing one or all dots in the display zone FBD.

Figure 8:
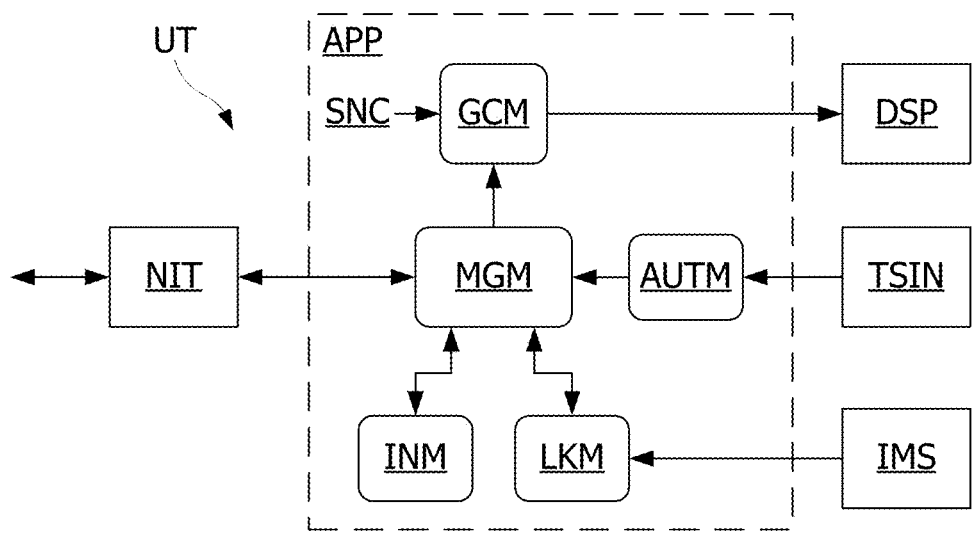
FIG. 8 is a block diagram of an application program executed by the user terminal, according to example embodiments.

FIG. 8 illustrates a functional architecture of the application APP, according to an example embodiment. The application APP may include a management module MGM, an initialization module INM, an authentication module AUTM, a link module LKM, a software component execution module GCM. The management module MGM may control the other modules INIM, RGM, LKM and GCM, and the communications between the application APP and the server ASRV through the communication circuits NIT. The initialization module INM performs step S9. The link module LKM performs steps S11 and S12. To this purpose, the link module can be connected to an image sensor IMS of terminal UT to acquire an optical code corresponding to the link token LTK to be received by the terminal UT, and displayed by the terminal OT. The authentication module AUTM performs steps S25 to S29 to process the authentication request received in step S23, to trigger the execution of the software component GC, and to receive and transmit the positions POSi typed by the user. The module AUTM may be connected to the keypad or a touch-sensitive surface TSIN of the terminal UT. The module GCM performs the step S27 to generate and display the image frames FRM at a suitable refresh rate, the module GCM selecting at each frame, input values to be applied to the software component GC and executing the latter. The module GCM may produce the image frames FRM which are displayed on the display screen DSP of the terminal UT.

Figure 9:
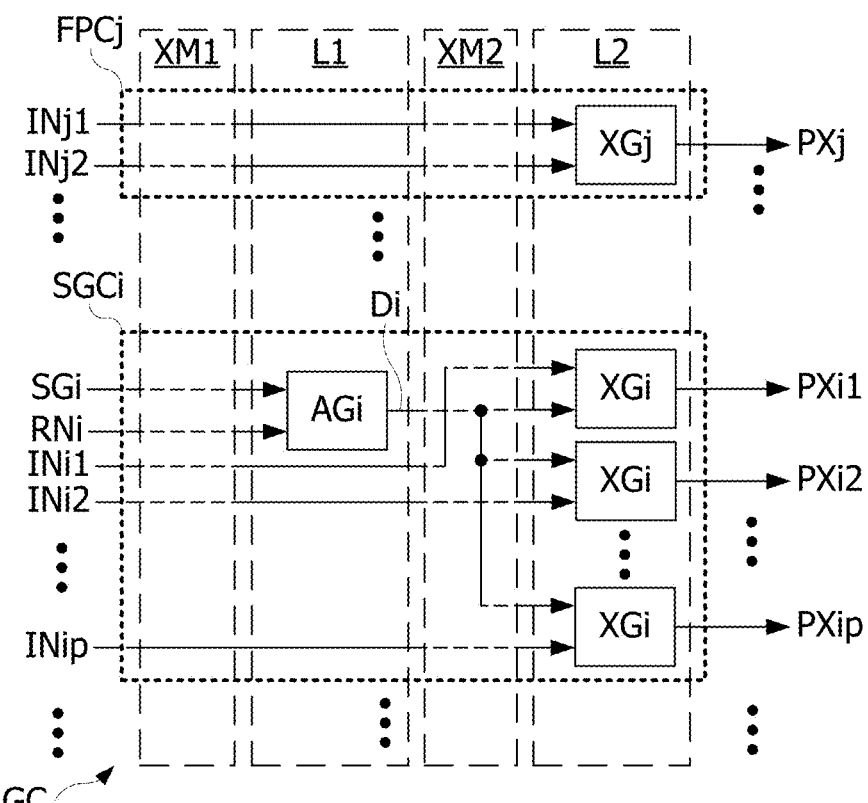
FIG. 9 is a block diagram of a circuit implemented by software in the user terminal, according to example embodiments.

FIG. 9 illustrates an example of a software component GC according to an example embodiment. The software component GC may be a software-implemented Boolean circuit encrypted as a garbled circuit. The software component GC may include two circuit layers L1, L2, and two interconnection matrices XM1, XM2. A first interconnection matrix XM1 may receive input data INi, INj, SGi, RNi of the software component GC. The first layer L1 may include logic gates AGi, each gate receiving two input values SGi, RNi from the matrix XM1 and providing one output value Di to the second interconnection matrix XM2. The second layer L2 may include logic gates XGi, XGj, each gate receiving two input values from the matrix XM2, and providing one output value PXi, PXj representing a pixel value. Each of the logic gates AGi of the first layer L1 may receive input values SGi, RNi of the software component GC, selected by the matrix XM1. Each of the logic gates XGi of the other layer L2 may receive one input value INi of the software component and one output value provided by one logic gate AGi belonging to a previous layer (L1), these input values being selected by the matrix XM2. Each of the logic gates XGj of the layer L2 may receive two input values INj1, INj2 of the software component. The input values may be selected by the matrix XM1 and/or XM2. This structure of the software component may enable parallel processing, since all logic gates in a same circuit layer L1, L2 can be processed at the same time.

In some implementations, to generate image frames FRM as shown in FIG. 6A, the software component GC may include one circuit SGCi for each of the segments SG that can be visible or invisible in the image frames FRM, and one circuit FPCj for each pixel PXj distinct from a segment pixel PXi, (e.g., around the segments SG or in the banner frame BNF). Thus, in the example of FIG. 6A, the image frames FRM to be displayed may include 70 segments (10 key label digit×7 segments per digit) for the keypad KYP, plus 14 segments (2 digits×7 segment per digit) for the validation code CC, the software component may include 84 circuits SGCi. Each of the circuits SGCi may include one logic gate AGi in the circuit layer L1, and as much logic gates XGi in the circuit layer L2, as the number of pixels PXi1, PXi2, PXip forming the segment SG as displayed in the image frames FRM.

The gate AGi may perform a logical operation such as, for example, AND, OR, NAND, NOR, to display each visible segment with a probability of approximately 50%, and each invisible segment with a probability of 0% to be visible. Each of the gates XGi may perform a logical XOR operation with an input INi of the software component. The gate AGi may receive one segment input value SGi and a corresponding random input value RNi. The output Di of the gate AGi may be connected to an input of all gates XGi of the circuit SGCi. Each gate XGi may also receive one of the input values INi1-INip and may provide one pixel value PXi1-PXip to the output of the circuit GC.

Each of the circuits FPCj may include one logic gate XGj performing a logical XOR operation per pixel PXj controlled by the software component GC and distinct from a segment pixel in the image frames FRM. Each of the gates XGj may receive two input values INj1, INj2 of the software component GC and may provide one pixel value PXj. Each of the gates XGj can be located either in layer L1 or in layer L2. The number of input values INi, INj can be limited to a value around the square root of the number of pixels PXi, PXj controlled by the software component GC.

The circuits SGCi may be configured to display the visible segments of the digits of the key labels KYL and validation code SG with a probability of approximately 50% and the invisible segments of these digits with a probability of approximately 0%. The structure of the software component GC can be adapted to apply other display probabilities to the visible and invisible segments of the digits to be displayed. Of course, the digits can also be controlled and/or arranged (e.g., with more segments) to display other signs than numbers such as alphabetic characters or more generally symbols including ASCII characters.

In the example of the software component of FIG. 9, one input INi or INj can be connected to several logic gates XGi, XGj, such that there are fewer inputs INi, INj than the number of logic gates XGi plus twice the number of logic gates XGj.

The interconnection matrix XM2 may define which pixel generated by the software component belongs to a segment SG. In some implementations, the position, orientation and shape of each segment SG may be varied by one or several pixels, depending on the display resolution of the user terminal, from one software component to another. This provision makes it more difficult to perform a machine optical recognition of the displayed symbols.

It may be observed that the term "segment" as used herein designates a set of pixels that may be controlled by a same one of the segment input values SGi. The set of pixels forming a segment may not be necessarily formed of adjacent pixels, but can include groups of adjacent pixels as the segments forming a key label KYL. In addition, the pixels forming a segment may all be visible or all invisible in one displayed image frame FRM.

Figures 10, 11:
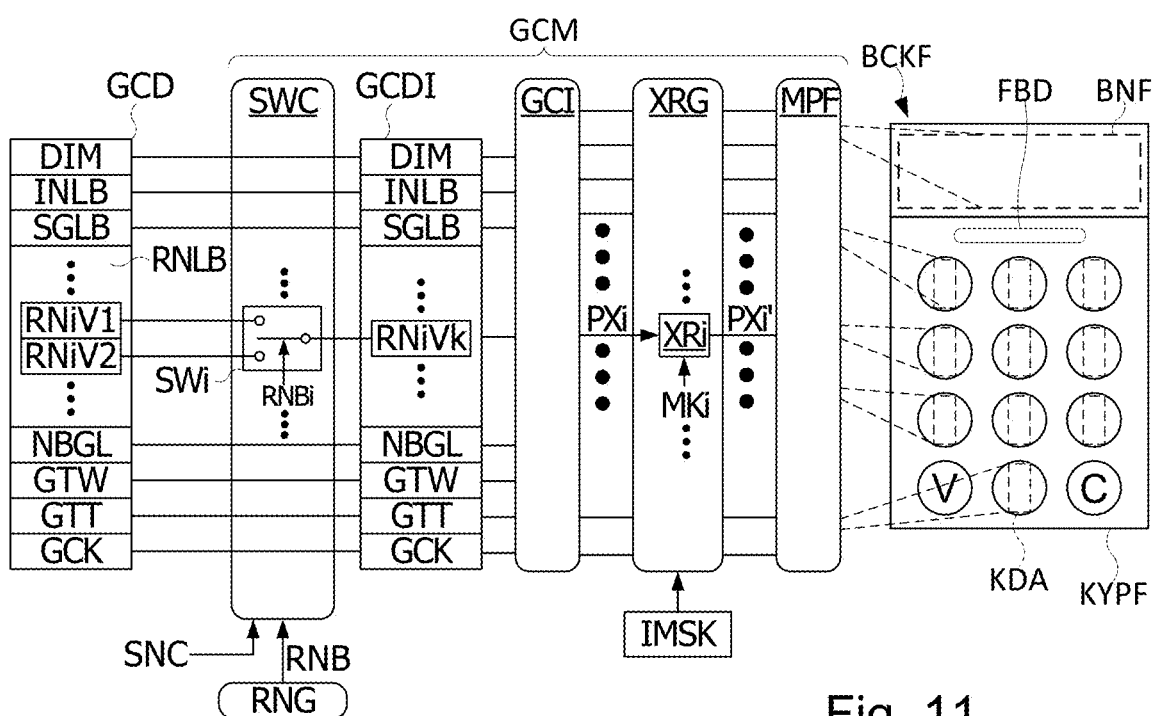
FIG. 10 is a block diagram of a database describing the circuit implemented in the user terminal, according to example embodiments.
FIG. 11 is a block diagram illustrating a processing performed by the application program for displaying the image frame of FIG. 6A, according to an embodiment.

FIG. 10 illustrates the structure and content data GCD defining the software component (which is transmitted in step S23), when it is designed as a garbled circuit, according to an example embodiment. The data GCD may include:

a unique software component identifier GCID, a number set DIM including a number n of input values INi, INj, a number of output values m, a number s of segment input values SGi or random input values RNi, a number g of gates AGi, XGi, XGj, a number k of gates AGi, a number w of wires in the circuit, and a number l of circuit layers L1, L2 in the circuit GC, an input data table INLB including all values of the inputs INi, INj of the circuit GC, for example numbered from 1 to n, as specified for the execution of the software component, a segment table SGLB including all values of the segment inputs SGi of the software component GC, numbered from 1 to s, as specified for the execution of the software component, a random data table RNLB including the random values RNi, numbered from 1 to s, a gate wire table GTW defining two input wires numbers IN1, IN2, an output wire number ON and a type identifier GTYP of each logic gate AG, XG of the software component GC, the gates of the circuit being numbered from 1 to g, and a gate truth table including four values OV00, OV01, OV10, OV11 for each of the logic gates AG of the software component GC.

In the example of FIG. 9, the type GTYP may specify that the corresponding logic gate performs either an XOR operation or another logical operation such as, for example, AND, OR, NOR, NAND.

In some implementations, the input values INi, SGi, RNi, INj and the output values Di, PXi, PXj of the logic gates AGi, XGi, XGj, each representing a binary logical state 0 or 1, may be defined by numbers of several bits, for example, 64 or 128 bits. In this way, each input and output within the garble circuit GC may have only two valid values, and all the other possible values, when considering the size in bits of these values, are invalid. When the software component GC is generated, the two valid values of each input SGi, RNi, INi, INj of the software component may be randomly chosen, provided that the least significant bit of the two valid values are different. The least significant bits may be used, when computing the output value of one of the logic gates, to select one value in the truth table of the logic gate.

The truth table GTT[i] of each logic gate AGi, may include four values OV00, OV01, OV10, OV11, each corresponding to a combination (0, 0), (0, 1), (1, 0), (1, 1) of binary input values corresponding to the input values of the logic gate. The topology of the software component may be defined in the table GTW, by numbering each wire of the software component, i.e. each input wire of the software component from 1 to (n+2s) and each output of the logic gates from (n+2s+1) to (n+2s+g), and by associating to each logic gate AGi, XGi, XGj one record of the table GTW including two wire numbers IN1, IN2 to the two inputs of the gate and one wire number ON to the output of the gate. The wire numbers of the outputs of the software component GC are numbered from (n+2s+g−m+1) to (n+2s+g).

In some implementations, the table RNLB may contain both valid values RNV1, RNV2 corresponding respectively to the logical states 0 and 1, of each of the random input values RNi. Each value RNV1, RNV2 can be equal with a same probability to either one or the other of the two valid values of the random value RNi corresponding respectively to the states 0 and 1.

The XOR gates XGi, XGj can be executed either by using a truth table which may be encoded in the table GTT or by applying XOR operations to each pairs of bits of same rank in the input values of the gate. In the latter case, the field GTYP of the table GTW may define whether the gate is a XOR gate or another gate, and the table GTT may include one record for each gate AGi only.

In some implementations, each value in the tables INLB, SGLB, RNLB, GTT may be encoded by a 128-bit word, and each record of the table GTW may be encoded on a 64-bit word. The wire numbers IN1, IN2, ON may be encoded on 21-bit words. The table GTW can be transmitted from the server ASRV to the terminal UT in a compressed form, for example using a gzip compression scheme.

In some implementations, the order of the logic gates in the gate tables GTW, and GTT can be defined randomly, provided that the table records GTW[i] and GTT[i] at the index i refer to the same gate.

FIG. 11 illustrates the module GCM, configured to execute a software component and to generate the image frames FRM, according with example embodiments. The module GCM may execute the software component each time a new image frame is to be generated, e.g., at a frame refresh rate equal to or greater than 30 Hz. To this purpose, the module GCM can be activated by a synchronization signal SNC having for example a rising edge each time a new image frame must be generated. The module GCM may include a switching module SWC, a software component interpreter GCI, an XOR masking circuit XRG, and a pixel mapping module MPF. The switching module SWC may receive the synchronization signal SNC and the structure and content data GCD defining the software component GC to be executed, and may load the data to be processed by the next execution of the software component GC in an input data structure GCDI. Thus, the switching module SWC may transmit the data DIM, INLB, SGLB, NBGL, GTW, GTT, and GCK without modification to the structure GCDI.

In some implementations, the switching module SWC may perform switching operations SWi to select one or the other of the two valid values RNiV1, RNiV2 of each input random value RNi. Each switching function SWi may be controlled by a respective bit RNBi of a random number RNB having s bits, generated by a random number generation function RNG, s being the number of the random values RNi to be input to the software component GC or the total number of segments SGi of all the digits to be displayed. Each switching operation SWi may provide for each of the random values RNi a randomly selected value RNiVk, which may be stored in the structure GCDI. As a result of the selection of one of the two valid values RNiV1, RNiV2 of the random values RNi (e.g., the visible segments SG to be displayed corresponding to an input data SGi set to the state one), the output of the corresponding AND gate AGi may be set to state either 0 or 1, depending on the logical state of the selected random value RNiVk. As a consequence, the visible segments SGi may appear in each frame FRM with a probability equal to the probability of the random input value RNi to be set to state 1. If the number RNB is a true random number, this probability may be equal to approximately 50%.

The module GCI may be a dedicated interpreting module configured to successively execute each of the logic gates of the first circuit layer L1, as defined by the data in the input data structure GCDI, and then each of the logic gates of second circuit layer L2. To this purpose, the interpreting module GCI can use a wire table receiving the value of each wire of the software component GC, written in the table at an index corresponding to the wire number of the wire value. The wire table may be first loaded with the input values INi, INj, SGi, RNiVk of the software component, written in the table at indexes (between 1 and n+2s) corresponding to wire numbers assigned to the input values. Then the computed output value of each executed logic gate may be written in the wire table at an index corresponding to the wire number of the output value. At the end of the software component execution, the wire table may include the values of the outputs of the software component at indexes from (n+2s+g−m+1) to (n+2s+g).

The output value of each logic gate can be computed by applying a non-reversible function applied to both input values of the gate and to one value selected in the truth table of the gate, as a function of the least significant bit of each of the two input values:

$$OV = PF1(IN1, IN2, G) \quad (1)$$

where IN1 and IN2 represent the input values of the gate, $G = GTT[IN1\{0\}//IN2\{0\}]$, $IN1\{0\}$ and $IN2\{0\}$ represent the least significant bit of the input values IN1, IN2, "//" represents the bit concatenation operator, GTT represents the four-element truth table of the gate, and PF1 represents the non-reversible function.

In some implementations, the function PF1 can use an encryption function such as AES (Advanced Encryption Standard) using an encryption key assigned to the software component. In this case, the encryption key GCK can be stored in the structure and content data GCD of the software component GC. For example, the output value OV of a logic gate can be computed as follows:

$$OV = AES(GCK, K) \oplus K \oplus G \quad (2)$$

with $K = CF(IN1, IN2) \oplus T$, "$\oplus$" represents the Exclusive OR (XOR) operator, T represents a number assigned to logic gate, for example the number of the logic gate, and can also depend on the values of the inputs IN1, IN2, CF represents a combination function, and AES(GCK, K) represents an encrypted value of K by the AES encryption algorithm using the encryption key GCK. The combination function can be an XOR operation or an operation in the form:

$$CF(IN1, IN2) = SH(IN1, a) \oplus SH(IN2, b), \quad (3)$$

SH(X,a) representing a left shift operation of X by a number "a" of bits.

The least significant bit of each output data of the software component GC provided by the module GCI is considered as a pixel value PXi, PXj. The module XRG may combine each pixel value PXi (least significant bit of each output value provided by the software component) with a respective mask bit value MKi belonging to an image mask IMSK provided in the structure and content data GCD. The combination operation used can be an XOR operation XRi. The respective least significant bits of the output values PXi, PXj of the software component may represent white noise since the output values of the software component including the least significant bit thereof are randomly chosen. Thus, the image parts generated by the software component may be in an encrypted form, and may be decrypted using the image mask IMSK.

The image mask IMSK may include the message MSG, such that when combined with the pixels PXj provided by the software component GC, the message MSG may become intelligible and combined with segments SG of the validation code CC. The image mask IMSK can also be configured to make visible the pixels PXi of a digit segment SG corresponding to a segment input value SGi fixed to the binary state 0 (segment configured to be invisible). In this way, the segment may be always visible (with a probability of 100%) in the generated image frames FRM. Another way to configure a segment consistently visible or invisible is to attribute a same value to the two random values RNiV1, RNiV2, corresponding to the related segment input value SGi in the transmitted structure and content data GCD.

In some implementations, the final mask IMSK may be transmitted to the user terminal UT in step S23 using another communication channel, for higher security.

The interconnection matrices XM1, XM2 may define where the pixels PXj corresponding to the input values INj and the pixels PXi corresponding to the segment input values SGi are displayed in the image frames FRM. The input values INi, INj define in relation with the image mask IMSK, if the corresponding pixel PXi, PXj in output of the software component GC is visible or invisible, the visibility of the pixels PXi, which may depend on the corresponding value of the random input RNi. The respective binary states of the input values INi, INj can be randomly selected at the time the software component is generated. The image mask IMSK may then be generated as a function of the selected binary states of the input values INi, INj. The interconnection matrices XML XM2 and the image frame FRM may be displayed which may define the visible and invisible pixels in the image frame.

The mapping module MPF may insert groups of pixels values PXi' provided by the module XRG, at suitable positions into a background image frame BCKF to generate one of the image frames FRM to be displayed. In particular, the module XRG may provide a group of pixels PXi' which may form the banner frame BNF as shown in FIG. 7, and may group pixels PXi' which may form each of the key labels KYL of one keypad frame KYPF to be displayed in a frame FRM. The mapping module MPF may insert the groups of pixels in respective predefined locations in the background image frame BCKF to generate one of the image frames FRM as shown in FIG. 6A. In some implementations, the module XRG may output a directly displayable image frame. In this case, the mapping module may not be mandatory.

The transmission of the two valid values of the random may input RNi in the structure and content data GCD of the software component, may enable introduction of randomness in the execution and may output data of the software component at a very low cost. In contrast, a software component producing random output data would require introduction of a random generator in the software component, which would add complexity to the garbled circuit, and hence increasing the size of the structure and content data GCD defining the software component. In addition, the transmission of the two valid values RNiV1, RNiV2 of the random inputs RNi does not reduce the security of the introduction of the password PC and validation code CC, since the correspondence between each random input value RNiV1, RNiV2 and a binary value 0 or 1 thereof cannot be established easily.

In some implementations, each time the user terminal UT has to perform a new authentication, a new software component GC displaying a keypad KYP with a different key layout and displaying a different validation code CC is executed in step S27.

In some implementations, in order to avoid the transmission of one software component GC (in step S23), each time the user terminal UT may be required to perform a new authentication, several alternative software components (defined by the structure and content data GCD) can be downloaded in the user terminal UT at one time, and the user terminal UT may select a non-already executed software component each time it has to perform a new authentication. As an example, several software components are downloaded with the application APP when the latter is downloaded and installed in a user terminal UT. Then, when one or several software components GC are used, a new set of software components can be downloaded from the server ASRV to the user terminal UT, e.g., when the user terminal UT has an efficient network connection.

In some implementations, several alternative software components GC may be stored in the user terminal UT in an encrypted form, and each time the user terminal UT execute a new software component, the server ASRV may send a corresponding decryption key to the user terminal UT.

In some implementations, only a part of each of the software components GC may be downloaded into the user terminal UT. The downloaded part of each software component GC can include, when the software components GC are garbled circuits, the data GCID, DIM, NBGL, GTW with or without the table RNLB. Each time the user terminal UT has to perform a new authentication, the server ASRV may only transmit to the terminal the data INLB, SGLB, GCK and IMSK, in step S23. Then, the user terminal UT may transmit the identifier GCID of the software component GC used for authentication to the server ASRV, for example in step S25 or S29. When it receives a software component identifier GCID from a user terminal UT, the server ASRV may check in the database UDB that the received identifier corresponds with a next unexecuted or valid software component previously transmitted to the user terminal UT. If the received identifier does not correspond with a next unexecuted or valid software component previously transmitted to the user terminal UT, the server ASRV may invalidate the user authentication and the corresponding transaction. The server ASRV may also invalidate a previous transaction performed with the same software component (corresponding to the same identifier GCID).

In some implementations, the server ASRV can assign a validity indicator (for example in the table GCP of FIG. 5) to each software component it generates for a user terminal UT. The server ASRV may set the validity indicator to valid when it transmits the corresponding software component to a user terminal in step S23, and to invalid when it receives the corresponding message ARP in step S29. In addition, the server ASRV can assign a validity period to each generated software component, in which a software component can be set to invalid when its validity period has elapsed. The server ASRV may be configured to rejects a message ARP transmitted in step S29 when it corresponds to a software component set to invalid.

In some implementations, several valid software components may be stored in the user terminal UT. Before executing a software component, the user terminal may select one of the valid stored software components, to be executed in step S27. Each of the valid stored software components can be ranked in a list of the stored valid software components. The valid software component to be executed by the user terminal can be selected randomly, or selected as a function of its rank in the list of stored valid software components. For this purpose, the rank of the valid software component to be executed can be predefined to a value known both by the server ASRV and the terminal. The rank value of the valid software component to be executed can be also transmitted by the server ASRV to the user terminal UT, for example, in step S25 (before the execution of a software component in step S27).

When the valid software component to be executed is randomly selected by the user terminal UT, the server ASRV can determine the last software component executed by the user terminal UT from the data POSi transmitted by the latter to the server, in step S29, and by executing one after the other, the valid software components that have been downloaded in the user terminal UT, until it executes the software component corresponding to the data transmitted in step S29. In the authentication procedure of FIG. 4, the server ASRV may execute the valid software components one after the other in steps S30, S31, until the transmitted positions POSi correspond to stored data CC, PC. If the transmitted positions POSi do not correspond to the stored data PC, CC with each of the valid software components in the user terminal UT, the user may not be authenticated. This adds a level of security since a hacker can no more determine the displayed images by executing the last software component transmitted to the terminal. Further, the hacker has also to determine which software component was executed by the terminal.

In some implementations, the method can determine to prevent a second execution of a same software component for security reasons. To this purpose, a valid software component can be set to invalid after its execution by the user terminal UT. For a higher security level, all the valid software components of a set of software components stored in the terminal can be set to invalid after the execution by the user terminal UT of one of these valid software components.

If the server ASRV determines that the data POSi are obtained from an invalid software component, the server may reject the authentication of the user of the terminal.

Only a data part of each of software components of a software component set can be downloaded into the user terminal UT. In this case, each time the user terminal UT has to perform a user authentication, the server ASRV may transmit to the user terminal UT a complementary data part of an already stored data part of one or several software components, in step S23, such that the terminal can execute any one of these several software components, in step S27. The output mask IMSK, which may be used to decrypt the output data provided by a software component may be the complementary data part that is transmitted to the user terminal in step S23.

Figure 12:
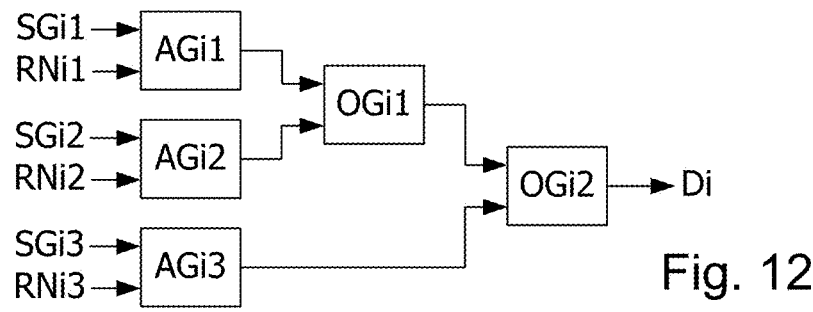
FIG. 12 is a block diagram of a part of the circuit of FIG. 9, according to another example embodiment.

FIG. 12 illustrates a part of the software component GC according to another example embodiment. The circuit part disclosed in FIG. 12 may be intended to replace one logic gate AGi in the circuit of FIG. 9. In the example of FIG. 12, the circuit part may include three AND gates AGi1, AGi2 and AGi3 and two OR gates OGi1, OGi2. Instead of having one segment input SGi and one random input RNi for each segment of the image frame FRM to be displayed with a probability lower than approximately 100%, this circuit part may include, for one segment, three segment inputs SGi1, SGi2, SGi3 and three corresponding random inputs RNi1, RNi2, RNi3. Each of the gates AGi1, AGi2, AGi3 may combine one respective segment input SGi1, SGi2, SGi3 with one respective random input RNi1, RNi2, RNi3. The outputs of the gates AGi1 and AGi2 may be connected to the inputs of the gate OGi1, and the outputs of the gates AGi3 and OGi1 may be connected to the inputs of the gate OGi2. The output Di of the gate OGi2 may be connected to as much gates XGi as the number of pixels forming the segment controlled by the inputs SGi1, SGi2, SGi3. In this way, when all the segment inputs SGi1, SGi2, SGi3 are set to the binary state 0, the output Di of the gate OGi2 may be set to the binary state 1 with a probability of approximately 0%. When only one of the segment inputs SGi1, SGi2, SGi3 is set to the binary state 1, the output Di of the gate OGi2 may be set to the binary state 1 with a probability of approximately 50%. When only two of the segment inputs SGi1, SGi2, SGi3 are set to the binary state 1, the output Di of the gate OGi2 may be set to the binary state 1 with a probability of approximately 75%, and when all the three segment inputs SGi1, SGi2, SGi3 are set to the binary state 1, the output Di of the gate OGi2 may be set to the binary state 1 with a probability of approximately 87.5%. Depending on the corresponding input values INi1-INip and corresponding mask bit values MKi1-MKip of the mask IMSK, and the segment input values SGi1, SGi2, SGi3, it may be possible to display a segment SGi with a probability fixed either to 0%, 12.5%, 25%, 50%, 75%, 82.5% or 100%. In some implementations—the visible segments SG may be displayed in the image frames FRM with a probability randomly set to either 12.5%, 25%, 50%, 75%; 82.5% or 100%.

These probabilities or others can be obtained using other combinations of logic gates combining the three segment input values SGi1, SGi2, SGi3 and the three random input values RNi1, RNi2, RNi3.

Further, other probability values can be reached by the software component, by increasing the number of inputs for one segment, and thus, by increasing the number of AND gates in the first circuit layer L1 and the number of combining OR gates in following circuit layers.

In some implementations, the visible segments may be displayed with a probability decreasing as a function of the experience level of the user. For example, at first authentications, performed from a first installation of the application APP, the visible segments SG can be displayed in the image frames FRM with high probabilities, e.g., between approximately 75% and 100%. As the experience level of the user grows, the probabilities can be progressively reduced and finally set to randomly-selected values, for example, between approximately 12.5% and 50%.

In the embodiment using garbled circuits, the generation of a software component, performed by the server ASRV in step S22, may include generating random values representing the binary states 0 and 1 of the input bits and of the output bits of the logic gates of the software component, in which some of the logic gate outputs corresponding to outputs of the garbled circuit. In some implementations, the generation of a software component may further include randomly selecting the interconnection matrices XM1, XM2, e.g., randomly selecting the links between the inputs of the software component and the inputs of the logic gates of the software component, and between the outputs of some logic gates and the inputs of other logic gates (definition of the table GTW). In some implementations, the generation of a software component may further include defining the truth tables GTT of the logic gates of the software component, and encrypting each value of these truth tables using an encryption key. For example, each four values G (=GTT[IN1{0}// IN2{0}]) of the truth table of a logic gate of the software component GC can be computed as follows:

$$G = PF2(IN1, IN2, OV) \qquad (4)$$

for each possible combination of the valid values of the inputs IN1, IN2 and the output OV, when considering the binary states corresponding to the valid values of IN1, IN2 and OV, and the logic operation performed by the logic gate, PF2 representing a non-reversible function. According to the example defined by equation (2), each four values G of the truth table of a logic gate can be computed as follows:

$$G = AES(GCK, K) \oplus K \oplus OV \quad (5)$$

with $K = CF(IN1, IN2) \oplus T$.

As a consequence, it may be difficult to determine the binary states of the input and output values and the function of the logic gates of the software component. As a result, the functioning of the software component GC cannot be easily determined. In addition, the software component can process only the two valid values of each input of the circuit, among a huge number of invalid values. Therefore, it may not be possible to apply any values to the inputs of the software component.

A hacker or a malware program executed by the terminal UT may be able to get the password PC input by the user in step S10. However, the knowledge of this password is not sufficient for the hacker to be authenticated in steps S21 to S32 since the typed positions POSi must correspond to the keypad KYP and validation code CC displayed by the execution of the software component GC transmitted to the terminal UT in step S23. The hacker or malware has a very short time to get the keypad key layout by analyzing the displayed image frames FRM or by executing or analyzing the software component.

When the server ASRV generates the software component GC, it can be decided to use another bit rank in the values of the wires of the software component for defining the corresponding binary state of these values. The bits at the selected bit rank in the input values a logic gate AGi may be used to select a data in the truth table GTT of the logic gate, and the bits at the selected bit rank in the output values PXi of the software component GC may be extracted and applied to the module XRG.

The illustrations described herein are intended to provide a general understanding of the structure of various example embodiments. These illustrations are not intended to serve as a complete description of all of the elements and features of apparatus, processors and systems that utilizes the structures or methods described therein. Many other example embodiments or combinations thereof may be apparent to those of ordinary skills in the art upon reviewing the disclosure by combining the disclosed example embodiments. Other example embodiments may be utilized and derived from the disclosure, such that structural and logical substitutions and changes may be made without departing from the scope of the disclosure.

The methods disclosed herein may be totally of partially implemented by software programs executable by the main processor HP (CPU) of the user terminal UT, and/or at least partially by the graphic processor GP of the user terminal UT.

Further, the methods disclosed herein are not limited to displaying sensitive information such as a keypad with a randomly selected layout and a validation code. Indeed, the object of such a display is to check that the user knows a secret data shared with the server ASRV and perceives information presented by the terminal in a way perceptible only by a human. Alternative challenge-response schemes can be implemented in other embodiments. According to example embodiments, the displayed message MSG may request the user to input a combination such as the sum or the multiplication of the digits of the displayed validation code CC.

In addition to this or in another embodiment, the generated frames may comprise differences with a previously generated frame.

According to another example embodiment, the flickering or blinking of segments may be controlled directly in/by the graphic processor, by setting pixel intensity, additive or subtractive pixel color, pixel refresh rate, or pixel flickering parameters of the graphic processor.

In some implementations, the challenge can be transmitted to the user using other means than by displaying it on a display screen. For instance, the challenge can be transmitted to the user by audio means using an audio cryptographic algorithm. According to this algorithm, an original audio sequence may be decomposed into a number of source audio sequences of the same length as the original audio sequence, in a way such that the original audio sequence can be reconstructed only by simultaneously playing all the source audio sequences generated by the decomposition, and such that it may be difficult to reconstruct the original audio sequence if any one of the source audio sequence is missing. Provision may be made to play two source audio sequences simultaneously. For example, one via the terminal UT and the other via other means, such as, a portable device having a memory storing a source audio sequence and a headphone playing the stored source audio sequence without a microphone of the terminal hearing it. If the user hears an intelligible audio message by playing the two source audio sequences simultaneously, it may mean that the source audio sequence played by the portable device complements the source audio sequence.

In some implementations, the user may record his fingerprints in step S10. In step S27, the software component GC displayed a message requesting the user to input one or two particular fingerprints, for example, the thumb print and the ring finger print. This message may be displayed using segments, as the digits representing the key labels KYL and validation code CC. In step S28, the user may input the requested fingerprints, and at the verification steps S30 and S31, the server ASRV may compare the input fingerprints with the one it stored after step S10. Here, the shared secret data may be the fingerprints and the information to be perceived by the user is the designation of the requested fingers.

Further, the methods disclosed herein are not limited to authenticating a user in view of validating a transaction. The methods disclosed herein may be applied to securely transmit sensible or secret information to or from a user, or more generally to securely perform a sensitive operation in a non-secure environment such as in a user terminal (smartphone, connected device, etc.).

Further, the methods disclosed herein are not limited to a method comprising displaying image frames and introduction of secret data (PC, CC) using a single user terminal. The methods disclosed herein may be applied to securely authenticate a user on another connected device, the frame images being displayed on the user terminal or on a remote display such as, a smartwatch, virtual reality glasses or lenses, or projected on a surface or in the form of a 3D image or any IoT (Internet of Things) device having display functions or the like. Similarly, the secret data may be input in another device connected to the user terminal or using voice or gesture. Therefore, the words "user terminal" may designate a single device or a set of devices including a terminal without a display, an IoT device, a smart home terminal, and any input terminal that allows the user to enter data.

In some implementations, the user terminal UT may be controlled by voice or gesture. Voice command may be translated to command. Each recognized command being equivalent to one of the positions POSi. The keypad may be replaced by any other representations such as the ones requiring a gesture, following a geometric figure or tracing links between dots. Further, the input terminal may be a 3D input terminal with which the user may interact by 3D gestures in the air. Therefore the positions POSi may be 3D coordinate positions in space.

In some implementations, the display may be any display including for example an ATM, a vending machine, a TV, a public display, a projected display, a virtual display a 3D display or a hologram. In other embodiments, the terminal may be any input equipment including for example a touch screen, a game accessory, a gesture acquisition system, a voice or sound command system.

In some implementations, the images frames FRM may be generated without applying the mask IMSK, and are displayed separately from the mask IMSK using two display devices, one of the two display devices being transparent, such as a display device in the form of eye lenses, the displayed images becoming intelligible to the user when they are superimposed with the displayed mask IMSK, the displayed white pixels of the mask being transparent and the displayed black pixels of the mask being opaque.

Further, the methods disclosed herein, introducing randomization in the execution of the software component protected against tampering and reverse-engineering, are not limited to generate blinking pixel in an image or an image frame. More generally, these methods can be used in any application in which a random state is required in a sensitive software function, protected against reverse-engineering and tampering, the software function receiving input data and providing output data. For example, these methods can be applied to protection of data without using encryption or decryption keys which may be exposed to key theft. In this example, the software component may be configured to provide a part of the protected data as a function of a set of random input data, each random input data having two possible values. Each combination of the random input values applied to the software component may be used to compute a respective part of the protected data. The number of combinations of the random input values may define the number of data parts that can be computed by executing the software component. As an example, the data to be protected can be images, and the data parts of such images can be pixel values of an image or color component values of the image pixels, wherein the execution of the software component provides a pixel value or a part thereof and a position of the pixel in the image. The parts of the data to be protected that may each be computed by one execution of the software component applied to one combination of the input values can be as small as desired. For instance, the software component can be configured to provide by one execution a point of a Gaussian curve or a value that is used to compute a histogram, the data part value corresponding to the highest value computed by the software component or to the value having the highest occurrence number in the histogram. Only a part of the protected data can be made accessible when only a part of the two alternative values of the input data of the software component is provided, only one value being provided for the other input data of the software component.

Figure 13:
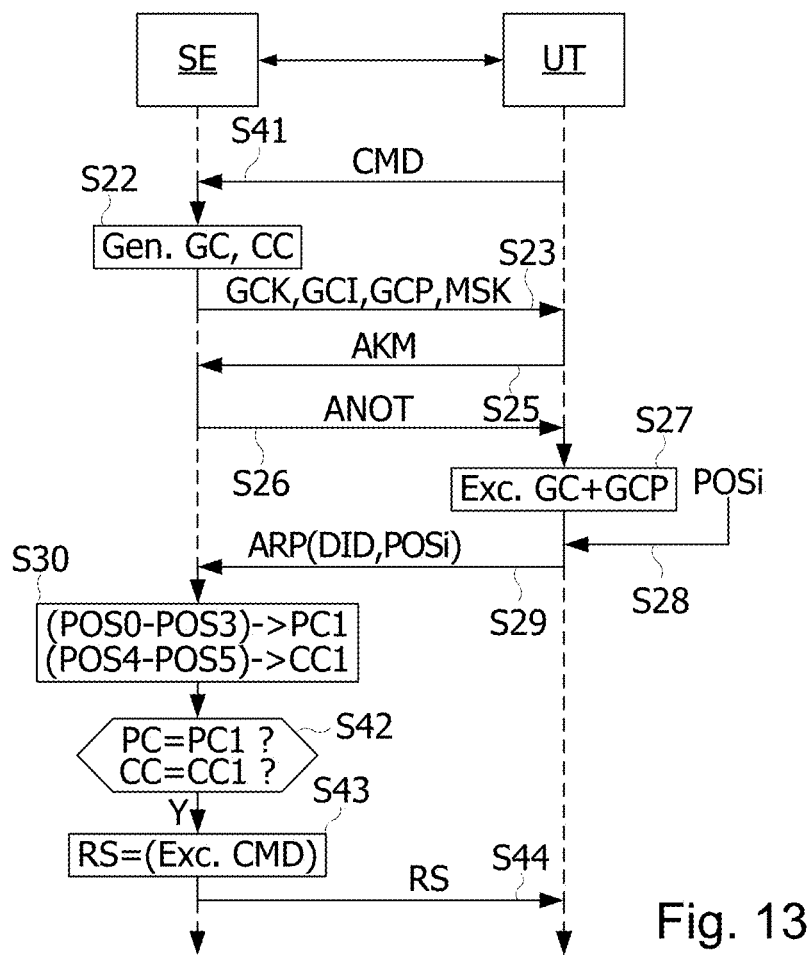
FIG. 13 is a sequential diagram showing authentication steps, according to another example embodiment.

Further, the methods disclosed herein are not limited to an implementation involving an authentication server. Other implementations can involve a secure element within the user terminal, such as the secure processor SE shown in FIG. 2, or a secure domain within the main processor HP of the terminal. In the methods disclosed herein, all operations performed by the server ASRV can be performed by such a secure element. FIG. 13 illustrates authentication steps S41 to S44 performed by the user terminal UT and a secure element SE linked to the main processor HP of the terminal UT, and enabling the secure element to authenticate the user. In step S41, the terminal UT may transmit a command CMD to the secure element SE. The command CMD may require an authentication of the user before being executed by the secure element. Then the secure element SE and the terminal UT performs steps S22, S23, and S25 to S30, as previously disclosed. The secure element SE performs steps S22, S23, S26 and S30, in place of the server ASRV. Then the secure element SE performs steps S42 to S44. In step S42, the secure element SE compares the password PC1 and validation code CC1 input by the user to corresponding values PC and CC securely stored by secure element SE. If the password PC1 and validation code CC1 typed by the user match the values PC and CC stored by the secure element SE, the latter performs step S43 in which it executes the command CMD requested in step S41. In step S44, the secure element SE transmits an execution report RS of the command CMD.

Further, the methods disclosed herein are not limited to an authentication of the user based on the introduction of a password PC, PC1 by the user. In a simplified authentication method, the user has only to introduce the displayed validation code CC Further, the methods disclosed herein are not limited to garbled circuits including gates having only two inputs and one output, as presented above for clarity of explanations only. Other types of gates with three or more inputs and one or more outputs or receiving data having more than two valid states may be implemented using truth tables having more than four lines. Therefore, the randomness obtained by transmitting and selecting one of the possible values RNiV1 and RNiV2 of the input RNi, may also be obtained by transmitting and randomly selecting one value among three or more valid values of an input of the garbled circuit.

Further, the methods disclosed herein are not limited to an implementation of the software component by a garbled circuit. Other implementations of the software component such as including obfuscated programs can be used to hide parts of the program loaded in the main processor of the terminal UT, and/or to prevent sensitive parts of the program from being unveiled or modified by unauthorized persons.

More generally, the conception of a garbled circuit can be perform by translating a program written in language such as C or C++ into a circuit design language such as VHDL or Verilog to obtain a logic or Boolean circuit comprising logic gates.

Further, the methods disclosed herein are not limited to the use of a software component protected against tampering and reverse-engineering, such as generated using obfuscation or garbled circuit methods. As an example of such an application, the methods disclosed herein may be used to perform operations that do not require high security level, such as data privacy protection, video games (e.g. management of available virtual lives) or medical eye testing.

Further, the methods disclosed herein are not limited to an implementation involving a mask such the image mask IMSK to decrypt output values of the software component. Other implementations can generate and execute a software component directly outputting the pixels values to be displayed. In addition, the message MSG can be directly provided in the output pixel values. In addition, the mask IMSK can be transmitted separately from the software component or the structure and content data thereof, e.g. via different transmission means, optionally after the execution of the software component, totally or in several parts.

Further, the methods disclosed herein can be implemented with a user terminal UT that only comprises a hardware keypad, the displayed frames FRM being displayed just to assign other key labels to the physical keypad. Thus, instead to touch positions of the display screen to input the positions POSi, the user activates hardware keys of the keypad in correspondence with the assigned labels shown in the displayed frames FRM.

The term pixel, as used herein for a standard display screen, may be understood as coordinates, either 2D coordinates for a 2D display or 3D coordinates for a 3D or stereo display or for a projected display, or the like.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a controller, a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional blocks not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, may be embodied in many alternate forms and should not be construed as limited to only the embodiments set forth herein.

Processors suitable for the processing of a computer program include, by way of example, both general and special-purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data (e.g., magnetic, magneto-optical disks, or optical disks). Information carriers suitable for embodying computer program instructions and data include all forms of non-volatile memory, including by way of example semiconductor memory devices (e.g., EPROM, EEPROM, and flash memory devices; magnetic disks (e.g., internal hard disks or removable disks); magneto-optical disks; and CD-ROM and DVD-ROM disks. The processor and the memory may be supplemented by, or incorporated in special-purpose logic circuitry.

To provide for interaction with a user, implementations may be implemented on a computer having a display device (e.g., a cathode ray tube (CRT), a light-emitting diode (LED), or liquid crystal display (LCD) display device) for displaying information to the user and a keyboard and a pointing device, e.g., a mouse or a trackball, by which the user can provide input to the computer. Other kinds of devices can be used to provide for interaction with a user, as well; for example, feedback provided to the user can be any form of sensory feedback (e.g., visual feedback, auditory feedback, or tactile feedback); and input from the user can be received in any form, including acoustic, speech, or tactile input.

Implementations may be implemented in a computing system that includes a back-end component (e.g., as a data server), or that includes a middleware component (e.g., an application server), or that includes a front-end component (e.g., a client computer having a graphical user interface or a Web browser through which a user can interact with an implementation), or any combination of such back-end, middleware, or front-end components. Components may be interconnected by any form or medium of digital data communication (e.g., a communication network). Examples of communication networks include a local area network (LAN) and a wide area network (WAN) (e.g., the Internet).

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

The invention claimed is:

1. A method for securely transmitting secret information to a user from a user terminal, comprising:
receiving, by the user terminal from a secure processor, a software component configured to generate sets of pixels, each set of pixels having a visible state and an invisible state, of which respective probabilities in the visible state or the invisible state being less than 100%;
executing, by the user terminal, the software component at a rate corresponding to a frame display refresh rate to generate the sets of pixels at the frame display refresh rate;
inserting the sets of pixels generated by each execution of the software component into one respective image frame; and
activating display of the image frames at the frame display refresh rate, each image frame including information which is specific to the software component and machine non-recognizable as being formed of the sets of pixels, the information becoming visibly recognizable to a user at the frame display refresh rate based on a human visual system,
wherein the software component is encoded as a circuit including:
circuit inputs, circuit outputs, logic gates and wires, each logic gate having two inputs and one output, each wire having a first end connected to one of the circuit inputs or to the one output of one of the logic gates and a second end connected to one of the two inputs of one of the logic gates or to one of the circuit outputs; and
a respective generation circuit for each generated set of pixels, each generation circuit including a first logic gate and a set of second logic gates, the first logic gate combines a first input data to a randomly selected second data, and provides an output data to a first input of each of the second logic gates, a second input of each of the second logic gates receiving a third input data, each of the outputs of the second logic gates providing a respective pixel value of one pixel of the set of pixels.

2. The method of claim 1, wherein
the software component is encoded as a garbled circuit generated by selecting a valid data for each binary state of each of the wires, and by computing for one logic gate of the garbled circuit, truth table values as a function of each valid data of each of the two inputs of the one logic gate, each valid data of the output of the one logic gate and a logic operation performed by one of the logic gates.

3. The method of claim 1, wherein one of the generation circuits includes several first logic gates to receive first input data and randomly-selected second input data, and provides the output data to each of the set of second logic gates.

4. The method of claim 1, wherein each set of pixels has at least one of a randomly selected position in the image frames, a randomly-selected orientation in the image frames, or a randomly-selected shape in the image frames.

5. The method of claim 1, wherein each set of pixels forms one segment, the segments formed by the pixel sets being arranged to form at least one of symbols, numeric characters or alphanumeric characters, each of the segments having a probability of less than 100% of being visible in one of the image frames.

6. The method of claim 1, wherein the software component is configured to provide an output data in one of two binary states with a probability between 12.5% and 87.5%, the method further comprising adjusting the probability to provide the output data in one of the two binary states as a function of a user experience level.

7. The method of claim 1, wherein the software component is configured to generate encrypted image parts of an image frame including pixels having a probability less than 100% to be included in one of two alternative binary states, the method further comprising:
decrypting, by the user terminal, the generated encrypted image parts, using a decryption mask which is transmitted to the user terminal, by combining each pixel of each generated encrypted image part with a respective pixel of the decryption mask;
inserting, by the user terminal, the decrypted image parts into an image frame background to generate the image frames at the frame display refresh rate; and
activating display of the generated image frames, by the user terminal, the displayed image frames including information that is machine non-recognizable as being formed of pixels having a probability lower than 100% to be visible in the displayed image frames, the information becoming visibly recognizable to a user at the frame display refresh rate based on a human visual system.

8. A method for securely transmitting a secret data from a user to a secure processor, comprising:
securely displaying a secret challenge to a user by a user terminal, the displayed secret challenge being secured by:
receiving, by the user terminal from a secure processor, a software component configured to generate sets of pixels, each set of pixels having a visible state and an invisible state, of which respective probabilities in the visible state or the invisible state being less than 100%;
executing, by the user terminal, the software component at a rate corresponding to a frame display refresh rate to generate the sets of pixels at the frame display refresh rate;
inserting the sets of pixels generated by each execution of the software component into one respective image frame; and
activating display of the image frames at the frame display refresh rate, each image frame including information corresponding to the secret challenge and which is specific to the software component and machine non-recognizable as being formed of the sets of pixels, the information becoming visibly recognizable to a user at the frame display refresh rate based on a human visual system;
acquiring data input by the user in relation with the displayed secret challenge;
transmitting, by the user terminal, the data input by the user to the secure processor, and
determining, by the secret processor, a secret data known by the user from the data input by the user in view of the secret challenge, the secret challenge being such that the secret data is determinable from the data input by the user only in view of the secret challenge,
wherein the software component is encoded as a circuit including:
circuit inputs, circuit outputs, logic gates and wires, each logic gate having two inputs and one output, each wire having a first end connected to one of the circuit inputs or to the one output of one of the logic gates and a second end connected to one of the two inputs of one of the logic gates or to one of the circuit outputs; and a respective generation circuit for each generated set of pixels, each generation circuit including a first logic gate and a set of second logic gates, the first logic gate combines a first input data to a randomly selected second data, and provides an output data to a first input of each of the second logic gates, a second input of each of the second logic gates receiving a third input data, each of the outputs of the second logic gates providing a respective pixel value of one pixel of the set of pixels.

9. A user terminal, comprising:

a processor; and a memory for storing information to be executed by the processor, the processor is configured to:

receive a software component configured to generate sets of pixels having a respective probability lower than 100% to be in a visible state or an invisible state;

execute the software component, at a rate corresponding to a frame display refresh rate, to generate the sets of pixels at the frame display refresh rate;

insert the sets of pixels, generated by each execution of the software component, into one respective image frame; and activate display of the image frames at the frame display refresh rate, each of the image frames including information which is specific to the software component and machine non-recognizable as being formed of the sets of pixels, the information becoming visibly recognizable to a user at the frame display refresh rate based on a human visual system, wherein the software component is encoded as a circuit including:

circuit inputs, circuit outputs, logic gates and wires, each logic gate having two inputs and one output, each wire having a first end connected to one of the circuit inputs or to the one output of one of the logic gates and a second end connected to one of the two inputs of one of the logic gates or to one of the circuit outputs; and a respective generation circuit for each generated set of pixels, each generation circuit including a first logic gate and a set of second logic gates, the first logic gate combines a first input data to a randomly selected second data, and provides an output data to a first input of each of the second logic gates, a second input of each of the second logic gates receiving a third input data, each of the outputs of the second logic gates providing a respective pixel value of one pixel of the set of pixels.

10. The user terminal of claim 9, wherein the software component is encoded as a garbled circuit generated by selecting a valid data for each binary state of each of the wires, and by computing for one logic gate of the garbled circuit, truth table values as a function of each valid data of each of the two inputs of the one logic gate, each valid data of the output of the one logic gate and a logic operation performed by one of the logic gates.

11. The user terminal of claim 9, wherein a secure processor is included in a secure element connected to a main processor of the user terminal.

12. The user terminal of claim 9, wherein the software component is transmitted by a remote server linked to the user terminal through a data transmission network.

13. A secure element, comprising:

a secure processor configured to:

generate a software component configured to generate sets of pixels having a respective probability lower than 100% to be in a visible state or an invisible state, the software component being executed at a rate corresponding to a frame display refresh rate to generate the sets of pixels at the frame display refresh rate, the sets of pixels generated by each execution of the software component being inserted into one respective image frame, each image frame including information which is specific to the software component and machine non-recognizable as being formed of the sets of pixels, the information becoming visibly recognizable to a user when the image frames are displayed at the frame display refresh rate based on a human visual system; and transmit the software component to a user terminal, wherein the software component is encoded as a circuit including:

circuit inputs, circuit outputs, logic gates and wires, each logic gate having two inputs and one output, each wire having a first end connected to one of the circuit inputs or to the one output of one of the logic gates and a second end connected to one of the two inputs of one of the logic gates or to one of the circuit outputs; and a respective generation circuit for each generated set of pixels, each generation circuit including a first logic gate and a set of second logic gates, the first logic gate combines a first input data to a randomly selected second data, and provides an output data to a first input of each of the second logic gates, a second input of each of the second logic gates receiving a third input data, each of the outputs of the second logic gates providing a respective pixel value of one pixel of the set of pixels.

14. The secure element of claim 13, wherein the secure element is integrated into or coupled to a server linked to the user terminal through a data transmission network.

15. A non-transitory computer-readable medium carrying code portions which, when carried out by a computer, configure the computer to carry out operations of:

receive a software component configured to generate sets of pixels, each set of pixels having a visible state and an invisible state, of which respective probabilities in the visible state or the invisible state being less than 100%;

execute the software component at a rate corresponding to a frame display refresh rate to generate the sets of pixels at the frame display refresh rate;

insert the sets of pixels generated by each execution of the software component into one respective image frame; and activate display of the image frames at the frame display refresh rate, each image frame including information which is specific to the software component and machine non-recognizable as being formed of the sets of pixels, the information becoming visible recognizable to a user at the frame display refresh rate based on a human visual system, wherein the software component is encoded as a circuit including:

circuit inputs, circuit outputs, logic gates and wires, each logic gate having two inputs and one output, each wire having a first end connected to one of the circuit inputs or to the one output of one of the logic gates and a second end connected to one of the two inputs of one of the logic gates or to one of the circuit outputs; and a respective generation circuit for each generated set of pixels, each generation circuit including a first logic gate and a set of second logic gates, the first logic gate combines a first input data to a randomly selected second data, and provides an output data to a first input of each of the second logic gates, a second input of each of the second logic gates receiving a third input data, each of the outputs of the second logic gates providing a respective pixel value of one pixel of the set of pixels.

16. The user terminal of claim 9, wherein the software component is encoded as a garbled circuit generated by selecting a valid data for each binary state of each of the wires, and by computing for one logic gate of the garbled circuit, truth table values as a function of each valid data of each of the two inputs of the one logic gate, each valid data of the output of the one logic gate and a logic operation performed by one of the logic gates.

17. The user terminal of claim 9, wherein one of the generation circuits includes several first logic gates to receive first input data and randomly-selected second input data, and provides the output data to each of the second logic gates.

18. The user terminal of claim 9, wherein each set of pixels has at least one of a randomly selected position, a randomly selected orientation in the image frames, or a randomly selected shape in the image frames.

19. The user terminal of claim 9, wherein each set of pixels forms one segment, the segments formed by the sets of pixels being arranged to form at least one of symbols, numeric characters or alphanumeric characters, each of the segments having a probability of less than 100% of being visible in the displayed image frame.

20. The user terminal of claim 9, wherein the software component is configured to provide an output data in one of two binary states with a probability between 12.5% and 87.5%, the processor further is configured to:
adjust the probability to provide the output data in one of the two binary states as a function of a user experience level.

21. The user terminal of claim 9, wherein the software component is configured to generate encrypted image parts of an image frame including pixels having a probability less than 100% to be included in one of two alternative binary states, the processor further is configured to:
decrypt the generated encrypted image parts, using a decryption mask which is transmitted to the user terminal, by combining each pixel of each generated encrypted image part with a respective pixel of the decryption mask;
insert the decrypted image parts into an image frame background to generate the image frames at the frame display refresh rate; and
activate displaying of the generated image frames, by the user terminal, the displayed image frames including information that is machine non-recognizable as being formed of pixels having a probability lower than 100% to be visible in the displayed image frames, the information becoming visibly recognizable to a user at the frame display refresh rate based on a human visual system.

22. The terminal of claim 9, wherein the displayed image frames represent a secret challenge, the terminal being further configured to:
acquire data input by the user in relation with the displayed secret challenge; and
transmit the data input by the user to the secure processor, a secret data known by the user being determinable from the data input by the user and the secret challenge.

* * * * *